(12) United States Patent
Han et al.

(10) Patent No.: US 8,477,868 B2
(45) Date of Patent: Jul. 2, 2013

(54) METHOD AND APPARATUS OF TRANSMITTING INFORMATION IN WIRELESS COMMUNICATION SYSTEM

(75) Inventors: Seung Hee Han, Anyang-si (KR); Moon Il Lee, Anyang-si (KR); Yeong Hyeon Kwon, Anyang-si (KR); Jin Sam Kwak, Anyang-si (KR); Dong Cheol Kim, Anyang-si (KR); Jae Hoon Chung, Anyang-si (KR); Sung Ho Moon, Anyang-si (KR); Min Seok Noh, Anyang-si (KR); Hyun Woo Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 63 days.

(21) Appl. No.: 13/054,351

(22) PCT Filed: Aug. 11, 2009

(86) PCT No.: PCT/KR2009/004478
§ 371 (c)(1),
(2), (4) Date: Jan. 14, 2011

(87) PCT Pub. No.: WO2010/018978
PCT Pub. Date: Feb. 18, 2010

(65) Prior Publication Data
US 2011/0126071 A1    May 26, 2011

Related U.S. Application Data

(60) Provisional application No. 61/087,737, filed on Aug. 11, 2008, provisional application No. 61/118,473, filed on Nov. 27, 2008.

(30) Foreign Application Priority Data

Jul. 9, 2009   (KR) ........................ 10-2009-0062714

(51) Int. Cl.
*H04B 7/02* (2006.01)
*H04L 1/02* (2006.01)

(52) U.S. Cl.
USPC .......................... 375/267; 375/259; 375/260

(58) Field of Classification Search
USPC ........................................................ 375/267
See application file for complete search history.

(56) References Cited

U.S. PATENT DOCUMENTS

2003/0235147 A1   12/2003 Walton
2006/0039496 A1    2/2006 Chae et al.
(Continued)

FOREIGN PATENT DOCUMENTS

JP   2004-524727 A    8/2004
JP   2007/536830 A   12/2007
(Continued)

OTHER PUBLICATIONS

T.G. Noh et al., "Standardization of 3GPP LTE and LTE-Advanced", Electronics and Communiication trend Analysis, vol. 23, No. 3. Jun. 2008.
(Continued)

*Primary Examiner* — Erin File
(74) *Attorney, Agent, or Firm* — McKenna Long & Aldridge LLP

(57) ABSTRACT

A method and an apparatus of transmitting information in a wireless communication system are provided. The method includes transmitting first information based on a first resource index through a first antenna and transmitting second information based on a second resource index through a second antenna.

12 Claims, 20 Drawing Sheets

U.S. PATENT DOCUMENTS

| | | | |
|---|---|---|---|
| 2006/0093066 A1 | 5/2006 | Jeong et al. | |
| 2006/0133530 A1 | 6/2006 | Kwak et al. | |
| 2007/0036179 A1 | 2/2007 | Palanki et al. | |
| 2007/0183386 A1 | 8/2007 | Muharemovic et al. | |
| 2007/0189404 A1 | 8/2007 | Baum et al. | |
| 2008/0117833 A1 | 5/2008 | Borran et al. | |
| 2008/0165893 A1 | 7/2008 | Malladi et al. | |
| 2008/0227481 A1 | 9/2008 | Naguib et al. | |
| 2008/0232240 A1* | 9/2008 | Baum et al. | 370/210 |
| 2008/0232449 A1 | 9/2008 | Khan et al. | |
| 2008/0233966 A1 | 9/2008 | Scheim et al. | |
| 2008/0273513 A1* | 11/2008 | Montojo et al. | 370/342 |
| 2009/0034468 A1 | 2/2009 | Muharemovic et al. | |
| 2009/0073955 A1 | 3/2009 | Malladi | |
| 2009/0092073 A1 | 4/2009 | Doppler et al. | |
| 2009/0239476 A1 | 9/2009 | Womack et al. | |
| 2009/0245194 A1 | 10/2009 | Damnjanovic et al. | |
| 2009/0276507 A1* | 11/2009 | Ahn et al. | 709/220 |
| 2009/0280819 A1 | 11/2009 | Brisebois et al. | |
| 2010/0150114 A1* | 6/2010 | Che | 370/336 |
| 2010/0177741 A1 | 7/2010 | Zhang et al. | |
| 2010/0177804 A1 | 7/2010 | Kwak et al. | |
| 2010/0179862 A1* | 7/2010 | Chassin et al. | 705/10 |
| 2011/0009137 A1* | 1/2011 | Chung et al. | 455/501 |
| 2011/0103367 A1 | 5/2011 | Ishii | |
| 2011/0158200 A1* | 6/2011 | Bachu et al. | 370/330 |
| 2011/0211522 A1* | 9/2011 | Chung et al. | 370/315 |
| 2011/0280203 A1* | 11/2011 | Han et al. | 370/329 |
| 2011/0292900 A1* | 12/2011 | Ahn et al. | 370/329 |
| 2012/0082113 A1* | 4/2012 | Lee et al. | 370/329 |
| 2012/0083302 A1 | 4/2012 | Borran et al. | |
| 2012/0099546 A1* | 4/2012 | Cho et al. | 370/329 |
| 2012/0263250 A1 | 10/2012 | Yap et al. | |

FOREIGN PATENT DOCUMENTS

| | | |
|---|---|---|
| JP | 2009-0290615 A | 12/2009 |
| JP | 4511611 B2 | 7/2010 |
| JP | 2011-530941 A | 12/2011 |
| KR | 10-2005-0081522 A | 8/2005 |
| KR | 10-2006-0032765 A | 4/2006 |
| KR | 10-2007-0091889 A1 | 9/2007 |
| KR | 10-2007-0119958 A1 | 12/2007 |
| KR | 10-2008-0056621 A1 | 6/2008 |
| KR | 10-2008-0064756 A | 7/2008 |
| KR | 10-2008-0065562 A1 | 7/2008 |
| KR | 10-2008-0073616 A1 | 8/2008 |
| KR | 10-2008-0096088 A1 | 10/2008 |
| KR | 10-2008-0097360 A1 | 11/2008 |
| WO | WO 02/47278 A2 | 6/2002 |
| WO | WO 03/021795 A2 | 3/2003 |
| WO | WO 2006/001909 A2 | 1/2006 |
| WO | WO 2006/019253 A1 | 2/2006 |
| WO | WO 2007/084988 A2 | 7/2007 |
| WO | WO 2007/119415 | 10/2007 |
| WO | WO 2008/044830 A1 | 4/2008 |
| WO | WO 2008/137864 A2 | 11/2008 |

OTHER PUBLICATIONS

Nortel, UL MIMO Enhancement for LTE-A, 3GPP R1-082516, Jul. 5, 2008.

Mitsubishi Electric, Uplink transmit diversity schemes for LTE Advanced, 3GPP R1-082522, Jul. 4, 2008.

Alcatel, ST/SF Coding and Mapping Schemes of the SC-FDMA in E-UTRA Uplink, 3GPP R1-063178, Nov. 10, 2006.

Qualcomm Europe, Further details on UL ACK/NAK resource allocation, 3GPP R1-081966, May 9, 2008.

Texas Instruments et al., On remaining Issues of PUCCH Slot Based CS/OC Remapping, 3GPP R1-082660, Jul. 4, 2008.

Panasonic et al., Joint Way forward on the ACK/NACK scrambling for PUCCH, 3GPP R1-082731, Jul. 4, 2008.

LG Electronics, "Uplink MIMO transmission for LTE-Advanced", 3GPP TSG RAN WG1 Meeting #55, Prague, Czech Republic, Nov. 10-14, 2008, R1-084199.

Nortel, "Performance evaluation of multi-antenna SC-FDMA in LTE-A", 3GPP TSG RAN WG1 Meeting #55, Prague, Czech Republic, Nov. 10-14, 2008, R1-084471.

Ericsson, "Carrier aggregation in LTE-Advanced", 3GPP TSG-RAN WG1 #53bis, R1-082468, Jul. 2008.

NEC Group, "PUCCH allocation for ACK/NACK transmission", 3GPP TSG RAN WG1 Meeting #50, R1-073462, Aug. 2007.

Motorola, "UL ACK/NACK for TDD", 3GPP TSG RAN1 #52, R1-080738, Feb. 2008.

Nokia Siemens Networks et al., "ACK/NACK Bundling Details for LTE TDD", 3GPP R1-081858, May 9, 2008.

Qualcomm Europe, "UL ACK/NACK assignment procedure", 3GPP R1-083176, Aug. 22, 2008.

InterDigital Communications et al., ACK/NACK Index Mapping for Uplink Transmission for E-UTRA, 3GPP, R1-074701, Nov. 9, 2007.

Huawei, "Physical layer technologies for LTE-Advanced", 3GPP, R1-081838, May 9, 2008.

Motorola, "Uplink ACK/NACK for TDD", 3GPP, R1-081292, Apr. 4, 2008.

Nokia Siemens Networks et al., "Implicit Mapping of ACK/NACK Resources", 3GPP, R1-080939, Feb. 15, 2008.

LG Electronics Inc., "Efficient Utilization of Unused PUCCH RB", 3GPP, R1-081258, Apr. 4, 2008.

Nokia Siemens Networks et al., "PUCCH Resource Allocation for Repeated ACK/NACK", 3GPP, R1-083722, Oct. 3, 2008.

* cited by examiner

Fig. 7
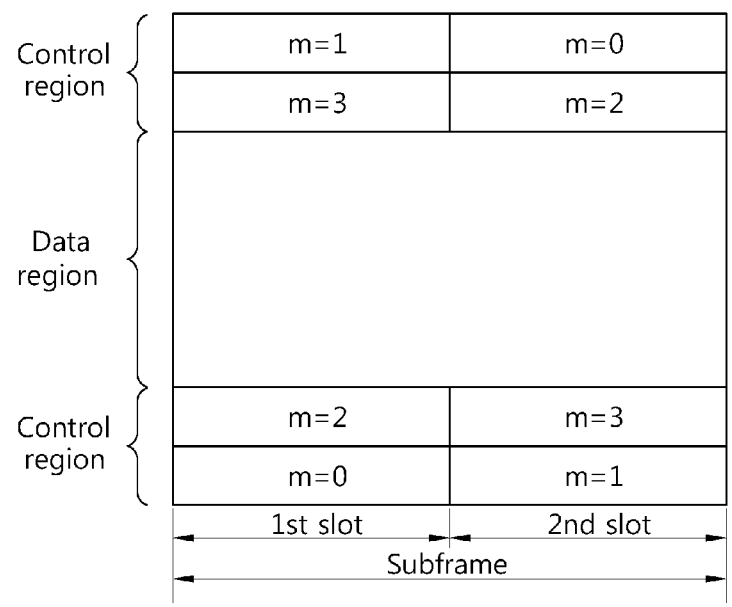
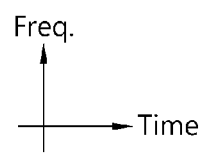

METHOD AND APPARATUS OF TRANSMITTING INFORMATION IN WIRELESS COMMUNICATION SYSTEM

This application claims the benefit of priority of U.S. Provisional Application No. 61/087,737 filed on Aug. 11, 2008, U.S. Provisional Application No. 61/118,473 filed on Nov. 27, 2008, Korean Patent Application No. 10-2009-0062714 filed on Jul. 9, 2009 and PCT Application No. PCT/KR2009/004478 filed Aug. 11, 2009, all of which are incorporated by reference in their entirety herein.

TECHNICAL FIELD

The present invention relates to wireless communications, and more particularly, to a method and an apparatus of transmitting information in a wireless communication system.

BACKGROUND ART

In next generation multimedia mobile communication systems, which have been actively studied in recent years, there is a demand for a system capable of processing and transmitting a variety of information (e.g., video and radio data) in addition to the early-stage voice service. Wireless communication systems are widely spread all over the world to provide various types of communication services such as voice or data. The wireless communication system is designed for the purpose of providing reliable communication to a plurality of users irrespective of their locations and mobility. However, a wireless channel has an abnormal characteristic such as path loss, noise, fading due to multipath, an inter-symbol interference (ISI), the Doppler effect due to mobility of a user equipment, etc. Therefore, various techniques have been developed to overcome the abnormal characteristic of the wireless channel and to increase reliability of wireless communication.

Multiple input multiple output (MIMO) is a technique for supporting reliable high-speed data services. The MIMO technique improves data transmission/reception efficiency by using multiple transmit antennas and multiple receive antennas. Examples of the MIMO technique include spatial multiplexing, transmit diversity, beamforming, etc. A MIMO channel matrix depending on the number of receive antennas and the number of transmit antennas can be decomposed into a plurality of independent channels. Each independent channel is referred to as a spatial layer or a stream. The number of streams is referred to as a rank.

As a mobile communication system of a next generation (i.e., post-3rd generation), an international mobile telecommunication-advanced (IMT-A) system is standardized aiming at support of an Internet protocol (IP)-based seamless multimedia service in an international telecommunication union (ITU) by providing a high-speed transmission rate of 1 gigabits per second (Gbps) in downlink communication and 500 megabits per second (Mbps) in uplink communication. In a 3rd generation partnership project (3GPP), a 3GPP long term evolution-advanced (LTE-A) system is considered as a candidate technique for the IMT-A system. The LTE-A system is evolved to increase a completion level of the LTE system, and is expected to maintain backward compatibility with the LTE system. This is because the provisioning of compatibility between the LTE-A system and the LTE system is advantageous in terms of user convenience, and is also advantageous for a service provider since existing equipment can be reused.

In general, a wireless communication system is a single carrier system supporting a single carrier. The transmission rate is proportional to transmission bandwidth. Therefore, for supporting a high-speed transmission rate, transmission bandwidth shall be increased. However, except for some areas of the world, it is difficult to allocate frequencies of wide bandwidths. For effectively using fragmented small frequency bands, a spectrum aggregation (also referred to as bandwidth aggregation or carrier aggregation) technique is being developed. The spectrum aggregation technique is to obtain the same effect as if which a frequency band of a logically wide bandwidth may be used by aggregating a plurality of physically discontiguous frequency bands in a frequency domain. Through the spectrum aggregation technique, multiple carrier (multi-carrier) can be supported in the wireless communication system. The wireless communication system supporting multi-carrier is referred to as a multi-carrier system. The carrier may be also referred to as a radio frequency (RF), component carrier, etc.

Meanwhile, various uplink control information are transmitted on an uplink control channel. Examples of the uplink control information include a hybrid automatic repeat request (HARM) acknowledgement (ACK)/not-acknowledgement (NACK), a channel quality indicator (CQI) indicating downlink channel quality, a scheduling request (SR) requesting resource allocation for uplink transmission, etc.

A plurality of UEs in a cell may simultaneously transmit uplink information to a base station (BS). The BS must be able to distinguish the uplink information simultaneously transmitted from the respective UEs. When the uplink information of the respective UEs are transmitted using different frequencies, the BS can distinguish the uplink information. A scheme of multiplexing a plurality of UEs by using mutually different frequencies is called frequency division multiplexing (FDM). The plurality of UEs in the cell may transmit the uplink information to the BS by using the same time-frequency resource. To distinguish the uplink information transmitted from the respective UEs by using the same time-frequency resource, the respective UEs may use orthogonal sequences in the transmission of the uplink information. Alternatively, the UEs may use low correlation sequences. As such, a scheme of multiplexing a plurality of UEs by using mutually different sequences is called code division multiplexing (CDM). Namely, uplink information of each UE may be multiplexed according to the CDM and/or FDM scheme and transmitted. In this respect, however, combining of the information transmission method based on the CDM scheme to a MIMO technique may cause a problem in that orthogonality is broken. With the orthogonality broken, it is more difficult for the BS to discriminate information of each UE than when the orthogonality is maintained. Thus, the reliability of wireless communication may deteriorate, and the overall system performance may be degraded.

Accordingly, there is a need for a method and an apparatus of effectively transmitting information by combining the MIMO technique and the CDM scheme and/or FDM scheme.

DISCLOSURE OF INVENTION

Technical Problem

The present invention provides a method and an apparatus of transmitting information in a wireless communication system.

Solution to Problem

In an aspect, a method of transmitting information in a wireless communication system, carried in a transmitter, is provided. The method includes transmitting first information based on a first resource index through a first antenna during a first interval and transmitting second information based on a second resource index through a second antenna during the first interval.

Preferably, the first resource index and the second resource index are different.

Preferably, each of the first information and the second information is information for a different component carrier.

Preferably, the first information corresponds to a first codeword generated by performing channel coding on a first information bit, and the second information corresponds to a second codeword generated by performing channel coding on a second information bit.

Preferably, the first information corresponds to some bits of a codeword generated by performing channel coding on a information bit, and the second information corresponds to the other remaining bits of the codeword.

The method may further include transmitting the second information based on the second resource index through the first antenna during a second interval and transmitting the first information based on the first resource index through the second antenna during the second interval.

Preferably, the first interval is a first slot in a subframe, and the second interval is a second slot in the subframe.

Preferably, each of the first interval and the second interval is an orthogonal frequency division multiplexing (OFDM) symbol.

Preferably, the first resource index indicates a first cyclic shift (CS) index and a first resource block (RB), and the second resource index indicates a second CS index and a second RB.

Preferably, the first resource index indicates a first CS index, a first orthogonal sequence (OS) index, and a first RB, and the second resource index indicates a second CS index, a second OS index, and a second RB.

Preferably, the first OS index and the second OS index are the same.

The method may further include transmitting the second information based on the second resource index through the first antenna during a second interval and transmitting the first information based on the first resource index through the second antenna during the second interval, wherein each of the first interval and the second interval is an OFDM symbol.

Preferably, the first information is first acknowledgement (ACK)/not-acknowledgement (NACK) information for first data transmitted through a first component carrier, and the second information is second ACK/NACK information for second data transmitted through a second component carrier.

In another aspect, an apparatus for a wireless communication is provided. The apparatus includes a radio frequency (RF) unit transmitting and/or receiving a radio signal and a processor coupled with the RF unit and configured to transmit first information based on a first resource index through a first antenna during a first interval and transmit second information based on a second resource index through a second antenna during the first interval.

Advantageous Effects of Invention

A method and an apparatus of effectively transmitting information are provided. Accordingly, overall system performance can be improved.

BRIEF DESCRIPTION OF DRAWINGS

FIG. 7 shows an exemplary structure of an uplink subframe in a 3GPP LTE.

MODE FOR THE INVENTION

The technique described below can be used in various multiple access schemes such as code division multiple access (CDMA), frequency division multiple access (FDMA), time division multiple access (TDMA), orthogonal frequency division multiple access (OFDMA), single carrier frequency division multiple access (SC-FDMA), etc. The SC-FDMA is a scheme by which inverse fast Fourier transform is performed on complex symbols which have been DFT (discrete Fourier transform)-spread, which is also called DFT spread-orthogonal frequency division multiplexing (DFTS- OFDM). The following technique may be used for a multi-access scheme such as clustered SC-FDMA, NxSC-FDMA, modifications of the SC-FDMA. The clustered SC-FDMA, which is also called clustered DFTS-OFDM, is a scheme by which the DFT-spread complex symbols are divided into a plurality of subblocks, and the subblocks are distributed in a frequency domain so as to be mapped to subcarriers. The NxSC-FDMA is a scheme by which a code block is divided into a plurality of chunks, and DFT and IFFT are performed by the respective chunks, which is also called chunk specific DFTS-OFDM.

The CDMA may be implemented with a radio technology such as Universal Terrestrial Radio Access (UTRA) or CDMA2000. The TDMA may be implemented with a radio technology such as Global System for Mobile communications (GSM)/General Packet Radio Service (GPRS)/Enhanced Data Rates for GSM Evolution (EDGE). The OFDMA may be implemented with a radio technology such as institute of electrical and electronics engineers (IEEE) 802.11 (Wi-Fi), IEEE 802.16 (WiMAX), IEEE 802-20, evolved-UTRA (E-UTRA) etc. The UTRA is a part of a universal mobile telecommunication system (UMTS). 3rd generation partnership project (3GPP) long term evolution (LTE) is a part of an evolved-UMTS (E-UMTS) using the E-UTRA. The 3GPP LTE employs the OFDMA in downlink and employs the SC-FDMA in uplink. LTE-advance (LTE-A) is an evolution of the 3GPP LTE.

For clarity, the following description will focus on the 3GPP LTE/LTE-A. However, the technical features of the present invention are not limited thereto.

Figure 1:
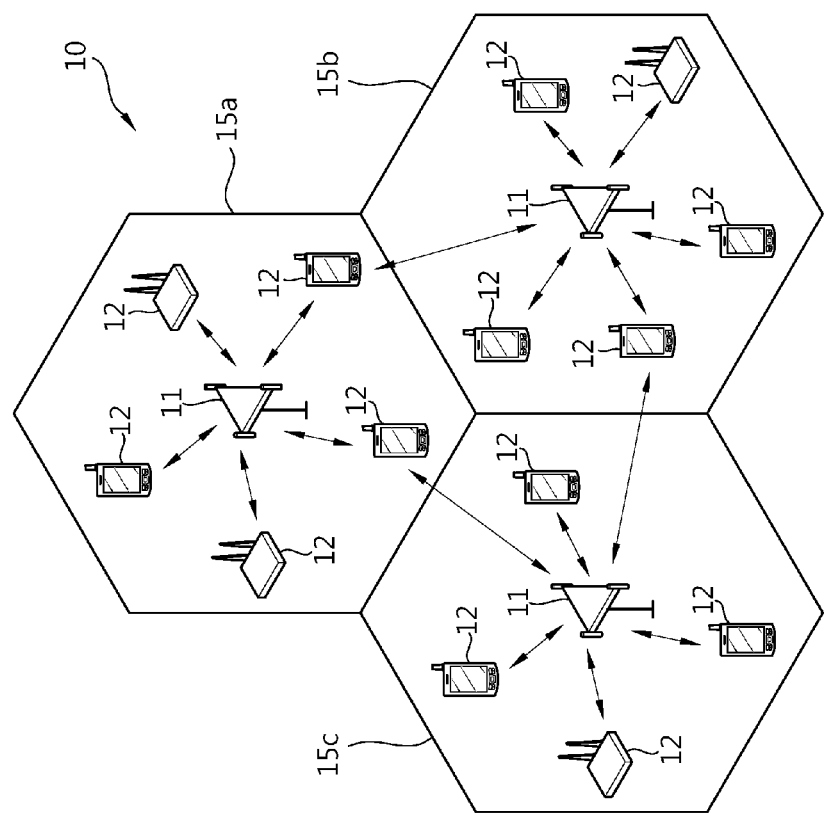
FIG. 1 is a block diagram showing a wireless communication system.

FIG. 1 is a block diagram showing a wireless communication system.

Referring to FIG. 1, a wireless communication system 10 includes at least one base station (BS) 11. The BSs 11 provide communication services to specific geographical regions (generally referred to as cells) 15a, 15b, and 15c. The cell can be divided into a plurality of regions (referred to as sectors). A user equipment (UE) 12 may be fixed or mobile, and may be referred to as another terminology, such as a mobile station (MS), a user terminal (UT), a subscriber station (SS), a wireless device, a personal digital assistant (PDA), a wireless modem, a handheld device, etc. The BS 11 is generally a fixed station that communicates with the UE 12 and may be referred to as another terminology, such as an evolved node-B (eNB), a base transceiver system (BTS), an access point, etc.

Hereinafter, a downlink (DL) denotes communication from the BS to the UE, and an uplink (UL) denotes communication from the UE to the BS. In the DL, a transmitter may be a part of the BS, and a receiver may be a part of the UE. In the UL, the transmitter may be a part of the UE, and the receiver may be a part of the BS.

A heterogeneous network means a network in which a relay station, a femto cell and/or a pico cell, etc. are deployed. In the heterogeneous network, a DL may denote communication from the BS to a relay station, a femto cell or a pico cell. The DL may also denote communication from the relay station to the UE. In addition, the DL also may denote from a first relay station to a second relay station for multi-hop relay. In the heterogeneous network, a UL may denote communication from the relay station, the femto cell, or the pico cell to the BS. The UL may also denote communication from the UE to the relay station. In addition, the UL may also denote from the second relay station to the first relay station for multi-hop relay.

The wireless communication system may be one of a multiple input multiple output (MIMO) system, a multiple input single output (MISO) system, a single input single output (SISO) system, and a single input multiple output (SIMO) system. The MIMO system uses a plurality of transmit antennas and a plurality of receive antennas. The MISO system uses a plurality of transmit antennas and a single receive antenna. The SISO system uses a single transmit antenna and a single receive antenna. The SIMO system uses a single transmit antenna and a plurality of receive antennas.

Hereinafter, a transmit antenna refers to a physical or logical antenna used to transmit a signal or a stream, and a receive antenna refers to a physical or logical antenna used to receive a signal or a stream.

The wireless communication system can support a UL and/or DL hybrid automatic repeat request (HARQ). In addition, a channel quality indicator (CQI) can be used for link adaptation.

Figure 2:
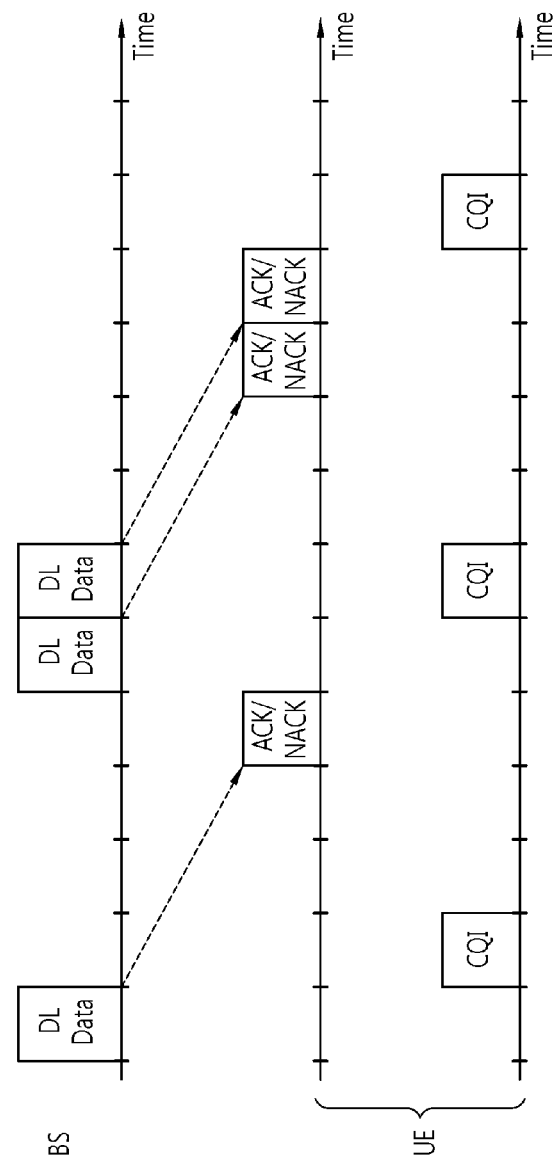
FIG. 2 shows transmission of a hybrid automatic repeat request (HARQ) acknowledgement (ACK)/not-acknowledgment (NACK) and a channel quality indicator (CQI).

FIG. 2 shows transmission of an HARQ acknowledgement (ACK)/not-acknowledgment (NACK) and a CQI.

Referring to FIG. 2, upon receiving DL data from a BS, a UE transmits the HARQ ACK/NACK after a specific time elapses. The DL data may be transmitted on a physical downlink shared channel (PDSCH) indicated by a physical downlink control channel (PDCCH). The HARQ ACK/NACK is ACK if the DL data is successfully decoded. The HARQ ACK/NACK is NACK if the DL data is unsuccessfully decoded. Upon receiving the NACK, the BS can retransmit the DL data until the ACK is received or until retransmission is performed the number of times corresponding to a maximum number of retransmissions.

A transmission time of the HARQ ACK/NACK with respect to the DL data, resource allocation information for transmission of the HARQ ACK/NACK, and the like, may be dynamically informed by the BS via signaling. Otherwise, the transmission time of the HARQ ACK/NACK, the resource allocation information, and the like, may be previously agreed depending on a transmission time of the DL data or resources used for transmission of the DL data. For example, in a frequency division duplex (FDD) system, if the PDSCH is received in an nth subframe, the HARQ ACK/NACK for the PDSCH can be transmitted on a physical uplink control channel (PUCCH) in an (n+4)th subframe.

The UE can report a CQI periodically and/or aperiodically to the BS by measuring a DL channel condition. The BS can perform DL scheduling by using the CQI. The BS may determine a modulation and coding scheme (MCS) used for transmission by using the CQI received from the UE. If a channel state is determined to be good based on the CQI, the BS may increase a modulation order or a coding rate to increase a transmission rate. If a channel state is determined to be not good, the BS may lower the modulation order or the coding rate to lower the transmission rate. By lowering the transmission rate, a reception error rate can be lowered. The CQI may indicate a channel state with respect to the entire band and/or a channel state with respect to a portion of the entire band. The BS may inform the UE about the transmission time of the CQI or the resource allocation information for CQI transmission.

The UE can report a precoding matrix indicator (PMI), a rank indicator (RI), etc. in addition to the CQI. The PMI indicates index of precoding matrix selected from a codebook. The RI indicates the number of useful transmission layers. Hereinafter, the CQI is a concept comprising the PMI and RI in addition to the CQI.

Figure 3:
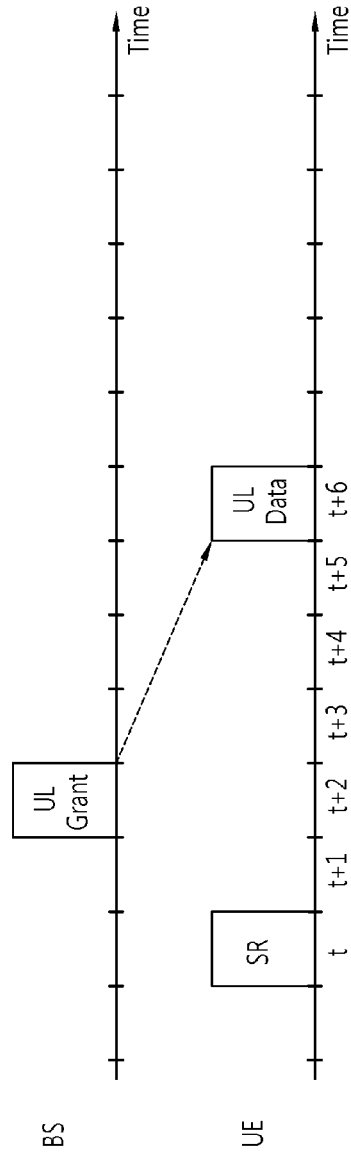
FIG. 3 shows uplink transmission.

FIG. 3 shows UL transmission.

Referring to FIG. 3, for UL transmission, a UE first transmits a scheduling request (SR) to a BS. The SR is used if the UE requests the BS to allocate a UL radio resource. The SR may be also referred to as a bandwidth request. The SR is a sort of preliminary information exchange for data exchange.

In order for the UE to transmit UL data to the BS, radio resource allocation is first requested by using the SR. The BS can report an SR transmission time or resource allocation information for the SR to the UE. The SR may be transmitted periodically. The BS can report a transmission period of the SR to the UE.

In response to the SR, the BS transmits a UL grant to the UE. The UL grant may be transmitted on a PDCCH. The UL grant includes information for UL radio resource allocation. The UE transmits the UL data by using an allocated radio resource.

As shown in FIGS. 2 and 3, the UE can transmit UL control information (i.e., HARQ ACK/NACK, CQI, and SR) at a given transmission time. The type and size of the UL control information may vary depending on systems, and the technical features of the present invention are not limited thereto.

Figure 4:
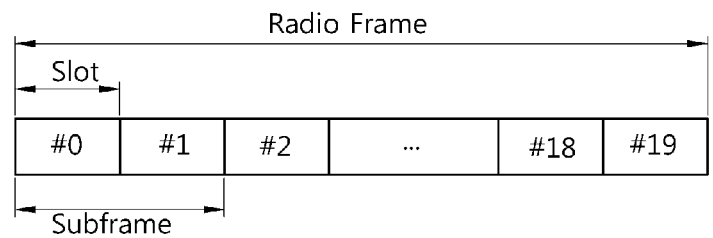
FIG. 4 shows a structure of a radio frame in a 3rd generation partnership project (3GPP) long term evolution (LTE).

FIG. 4 shows a structure of a radio frame in a 3GPP LTE.

Referring to FIG. 4, the radio frame consists of 10 subframes. One subframe consists of two slots. Slots included in the radio frame are numbered with slot numbers #0 to #19. A time required to transmit one subframe is defined as a transmission time interval (TTI). The TTI may be a scheduling unit for data transmission. For example, one radio frame may have a length of 10 milliseconds (ms), one subframe may have a length of 1 ms, and one slot may have a length of 0.5 ms.

The structure of the radio frame is shown for exemplary purposes only. Thus, the number of subframes included in the radio frame or the number of slots included in the subframe may change variously.

Figure 5:
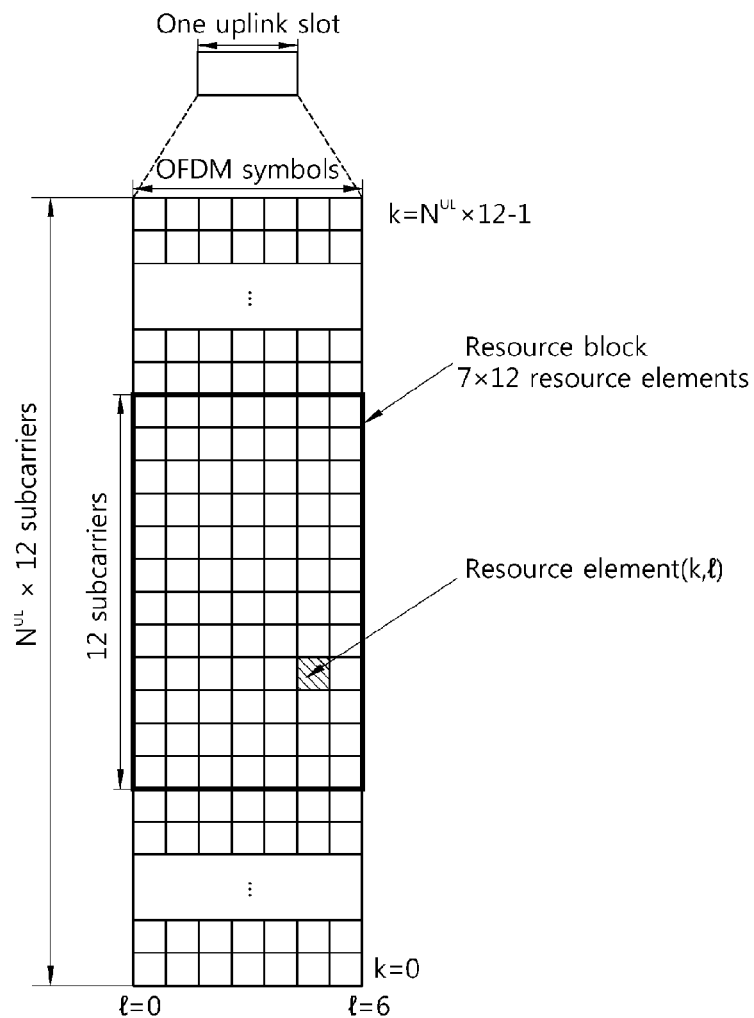
FIG. 5 shows an example of a resource grid for one uplink slot in a 3GPP LTE.

FIG. 5 shows an example of a resource grid for one UL slot in a 3GPP LTE.

Referring to FIG. 5, the UL slot includes a plurality of orthogonal frequency division multiplexing (OFDM) symbols in a time domain and $N^{UL}$ resource blocks (RBs) in a frequency domain. The OFDM symbol is for expressing one symbol period. The OFDM symbol may be applied for the multi-access schemes such as OFDMA, SC-FDMA, clustered SC-FDMA, N×SC-FDMA, or the like. The OFDM symbol may be referred to as an SC-FDMA symbol, an ORDMA symbol, or a symbol period according to systems.

The RB includes a plurality of subcarriers in the frequency domain. The number of RBs $N^{UL}$ included in the UL slot depends on a UL transmission bandwidth configured in a cell.

Each element on the resource grid is referred to as a resource element. The resource element on the resource grid can be identified with an index pair (k, l) within a slot. Herein, k (k=0, ..., $N^{UL}$×12−1) denotes a subcarrier index in the frequency domain, and l (l=0, ..., 6) denotes a symbol index in the time domain.

Although it is described herein that one RB includes 7×12 resource elements consisting of 7 OFDM symbols in the time domain and 12 subcarriers in the frequency domain, this is for exemplary purposes only. Thus, the number of OFDM symbols and the number of subcarriers in the RB are not limited thereto. The number of subcarriers or the number of OFDM symbols included in the RB may change variously. Hereinafter, the RB means a general frequency resource. That is, if RBs are different, frequency resources are different. The number of OFDM symbols may change according to a length of a cyclic prefix (CP). For example, if a normal CP is used, the number of OFDM symbols is 7, and if an extended CP is used, the number of OFDM symbols is 6.

The resource grid for one UL slot for the 3GPP LTE of FIG. 5 can also apply to a resource grid for a DL slot.

Figure 6:
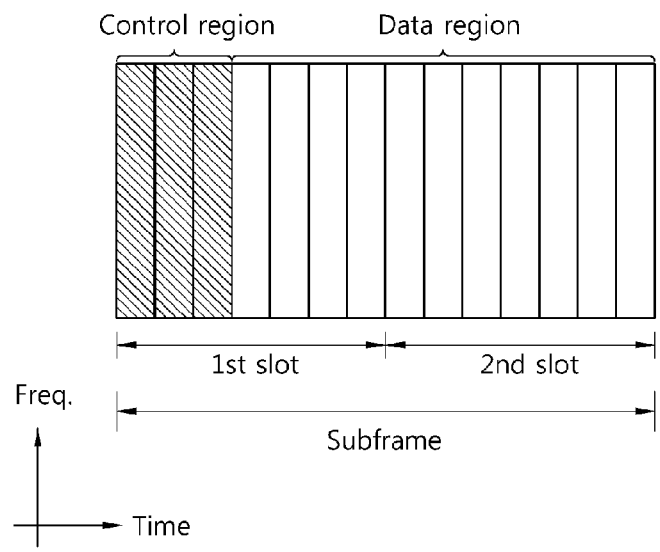
FIG. 6 shows an exemplary structure of a downlink subframe in a 3GPP LTE.

FIG. 6 shows an exemplary structure of a DL subframe in a 3GPP LTE.

Referring to FIG. 6, the DL subframe includes two consecutive slots. A maximum of three OFDM symbols located in a front portion of a 1st slot within the DL subframe correspond to a control region. The remaining OFDM symbols correspond to a data region.

A PDSCH may be allocated to a data region. DL data is transmitted on the PDSCH. The DL data may be a transport block, namely, a data block for a downlink shared channel (DL-SCH), a transport channel, transmitted during a TTI. The BS may transmit DL data to the UE on a single antenna or multiple antennas. In the 3GPP LTE, the BS may transmit one codeword to the UE on a single antenna or multiple antennas, and transmit two codewords to the UE on multiple antennas. Namely, in the 3GPP LTE, up to two codewords are supported. The codeword is coded bits obtained by channel coding on information bits corresponding to information. Modulation may be performed on every codeword.

Control channels such as a physical control format indicator channel (PCFICH), a physical hybrid ARQ indicator channel (PHICH), a PDCCH, etc., can be allocated to the control region.

The PCFICH carries information about the number of OFDM symbols used for transmission of PDCCHs in a subframe. Here, the inclusion of three OFDM symbols in a control region is merely illustrative. The PHICH carries HARQ ACK/NACK with respect to UL transmission.

The control region consists of a set of control channel elements (CCEs). The CCEs are indexed 0 to N(CCE)−1, where N(CCE) is the total number of CCEs constituting the set of CCEs in a DL subframe. The CCE corresponds to a plurality of resource element groups. The resource element groups are used for defining the mapping of a control channel to resource elements. One resource element group includes a plurality of resource elements. A PDCCH is transmitted on an aggregation of one or several consecutive CCEs. A plurality of PDCCHs may be transmitted in the control region.

The PDCCH carries DL control information such as DL scheduling information, UL scheduling information, UL power control command, or the like. If a BS transmits DL data to a UE on a PDSCH in a subframe, the BS carries DL information used for scheduling of the PDSCH on a PDCCH in the subframe. The UE may decode the DL control information to read the DL data transmitted on the PDSCH.

FIG. 7 shows an exemplary structure of a UL subframe in a 3GPP LTE.

Referring to FIG. 7, the UL subframe may be divided into a control region allocated to a PUCCH carrying UL control information and a data region allocated to a physical uplink shared channel (PUSCH) carrying UL data. To maintain a single carrier property in the 3GPP LTE (Release 8), RBs allocated to one UE are contiguous in a frequency domain. One UE cannot simultaneously transmit the PUCCH and the PUSCH. An LTE-A (Release 10) considers a concurrent transmission of the PUCCH and the PUSCH.

The PUCCH for one UE is allocated to an RB pair in a subframe. RBs belonging to the RB pair occupy mutually different subcarriers in each of a 1st slot and a 2nd slot. The frequency occupied by RBs belonging to the RB pair allocated to the PUCCH is changed based on a slot boundary. Namely, the RBs allocated to the PUCCH are hopped at a slot level. Hereinafter, RB hopping at a slot level will be referred to as frequency hopping. By transmitting, by the UE, the UL control information through mutually different frequency positions over time, a frequency diversity gain can be obtained. m denotes a location index indicating a logical frequency domain location of an RB pair allocated to the PUCCH in the subframe.

The PUSCH is mapped to an uplink shared channel (UL-SCH) that is a transport channel. Examples of UL control information transmitted on the PUCCH include HARQ ACK/NACK, a CQI indicating a DL channel condition, an SR that is a UL radio resource allocation request, etc.

The PUCCH can support multiple formats. That is, it is possible to transmit the UL control information whose number of bits per subframe differs according to the modulation scheme depending on the PUCCH formats' applications. The following table shows an example of a modulation scheme and the number of bits per subframe with respect to a PUCCH format.

TABLE 1

| PUCCH format | Modulation scheme | Number of bits per subframe |
|---|---|---|
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + QPSK | 22 |

A PUCCH format 1 is used to transmit the SR. A PUCCH format 1a/1b is used to transmit the HARQ ACK/NACK. A PUCCH format 2 is used to transmit the CQI. A PUCCH format 2a/2b is used to transmit the CQI and the HARQ ACK/NACK.

In any subframe, if the HARQ ACK/NACK is transmitted alone, the PUCCH format 1a/1b is used, and if the SR is transmitted alone, the PUCCH format 1 is used. The UE can transmit the HARQ ACK/NACK and the SR at the same subframe simultaneously. For positive SR transmission, the UE transmits the HARQ ACK/NACK by using a PUCCH resource allocated for the SR. For negative SR transmission, the UE transmits the HARQ ACK/NACK by using a PUCCH resource allocated for the ACK/NACK.

Control information transmitted on the PUCCH can use a cyclically shifted sequence. The cyclically shifted sequence can be generated by cyclically shifting a base sequence by a specific cyclic shift (CS) amount. The specific CS amount is indicated by a CS index. Various types of sequences can be used as the base sequence. For example, well-known sequences (e.g., a pseudo-random (PN) sequence and a Zadoff-Chu (ZC) sequence) can be used as the base sequence. In addition, a constant amplitude zero auto-correlation (CAZAC) sequence generated by a computer can be used as the base sequence. The following equation shows an example of the base sequence.

MathFigure 1

$$r_i(n) = e^{jb(n)\pi/4} \quad \text{[Math. 1]}$$

Herein, $i \in \{0, 1, \ldots, 29\}$ denotes a root index, and n denotes an element index satisfying $0 \leq n \leq N-1$, where N is a length of the base sequence. i can be determined by a cell identifier (ID) and a slot number in a radio frame or the like. If one RB includes 12 subcarriers, N may be set to 12. A different base sequence is defined in accordance with a different root index. If N=12, b(n) can be defined by the following table.

TABLE 2

| i | b(0), ..., b(11) | | | | | | | | | | | |
|---|---|---|---|---|---|---|---|---|---|---|---|---|
| 0 | -1 | 1 | 3 | -3 | 3 | 3 | 1 | 1 | 3 | 1 | -3 | 3 |
| 1 | 1 | 1 | 3 | 3 | 3 | -1 | 1 | -3 | -3 | 1 | -3 | 3 |
| 2 | 1 | 1 | -3 | -3 | -3 | -1 | -3 | -3 | 1 | -3 | 1 | -1 |
| 3 | -1 | 1 | 1 | 1 | 1 | -1 | -3 | -3 | 1 | -3 | 3 | -1 |
| 4 | -1 | 3 | 1 | -1 | 1 | -1 | -3 | -1 | 1 | -1 | 1 | 3 |
| 5 | 1 | -3 | 3 | -1 | -1 | 1 | 1 | -1 | -1 | 3 | -3 | 1 |
| 6 | -1 | 3 | -3 | -3 | -3 | 3 | 1 | -1 | 3 | 3 | -3 | 1 |
| 7 | -3 | -1 | -1 | -1 | 1 | -3 | 3 | -1 | 1 | -3 | 3 | 1 |
| 8 | 1 | -3 | 3 | 1 | -1 | -1 | -1 | 1 | 1 | 3 | -1 | 1 |
| 9 | 1 | -3 | -1 | 3 | 3 | -1 | -3 | 1 | 1 | 1 | 1 | 1 |
| 10 | -1 | 3 | -1 | 1 | 1 | -3 | -3 | -1 | -3 | -3 | 3 | -1 |
| 11 | 3 | 1 | -1 | -1 | 3 | 3 | -3 | 1 | 3 | 1 | 3 | 3 |
| 12 | 1 | -3 | 1 | 1 | -3 | 1 | 1 | 1 | -3 | -3 | -3 | 1 |
| 13 | 3 | 3 | -3 | 3 | -3 | 1 | 1 | 3 | -1 | -3 | 3 | 3 |
| 14 | -3 | 1 | -1 | -3 | -1 | 3 | 1 | 3 | 3 | 3 | -1 | 1 |
| 15 | 3 | -1 | 1 | -3 | -1 | -1 | 1 | 1 | 3 | 1 | -1 | -3 |
| 16 | 1 | 3 | 1 | -1 | 1 | 3 | 3 | 3 | -1 | -1 | 3 | -1 |
| 17 | -3 | 1 | 1 | 3 | -3 | 3 | -3 | -3 | 3 | 1 | 3 | -1 |
| 18 | -3 | 3 | 1 | 1 | -3 | 1 | -3 | -3 | -1 | -1 | 1 | -3 |
| 19 | -1 | 3 | 1 | 3 | 1 | -1 | -1 | 3 | -3 | -1 | -3 | -1 |
| 20 | -1 | -3 | 1 | 1 | 1 | 1 | 3 | 1 | -1 | 1 | -3 | -1 |
| 21 | -1 | 3 | -1 | 1 | -3 | -3 | -3 | -3 | -3 | 1 | -1 | -3 |
| 22 | 1 | 1 | -3 | -3 | -3 | -3 | -1 | 3 | -3 | 1 | -3 | 3 |
| 23 | 1 | 1 | -1 | -3 | -1 | -3 | 1 | -1 | 1 | 3 | -1 | 1 |
| 24 | 1 | 1 | 3 | 1 | 3 | 3 | -1 | 1 | -1 | -3 | -3 | 1 |
| 25 | 1 | -3 | 3 | 3 | 1 | 3 | 3 | 1 | -3 | -1 | -1 | 3 |
| 26 | 1 | 3 | -3 | -3 | 3 | -3 | 1 | -1 | -1 | 3 | -1 | -3 |
| 27 | -3 | -1 | -3 | -1 | -3 | 3 | 1 | -1 | 1 | 3 | -3 | -3 |
| 28 | -1 | 3 | -3 | 3 | -1 | 3 | 3 | -3 | 3 | 3 | -1 | -1 |
| 29 | 3 | -3 | -3 | -1 | -1 | -3 | -1 | 3 | -3 | 3 | 1 | -1 |

A cyclically shifted sequence r(n, Ics) can be generated by cyclically shifting a base sequence r(n) according to the following equation.

MathFigure 2

$$r(n, I_{cs}) = r(n) \cdot \exp\left(\frac{j2\pi I_{cs} n}{N}\right), \quad 0 \leq I_{cs} \leq N-1 \quad \text{[Math. 2]}$$

Herein, Ics denotes a CS index indicating a CS amount ($0 \leq I_{cs} \leq N-1$, where Ics is an integer).

Hereinafter, an available CS index of the base sequence means a CS index that can be derived from the base sequence according to a CS interval. For example, if the base sequence has a length of 12 and the CS interval is 1, the total number of available CS indices of the base sequence is 12. If the base sequence has a length of 12 and the CS interval is 2, the total number of available CS indices of the base sequence is 6. The CS interval can be determined by considering a delay spread.

Figure 8:
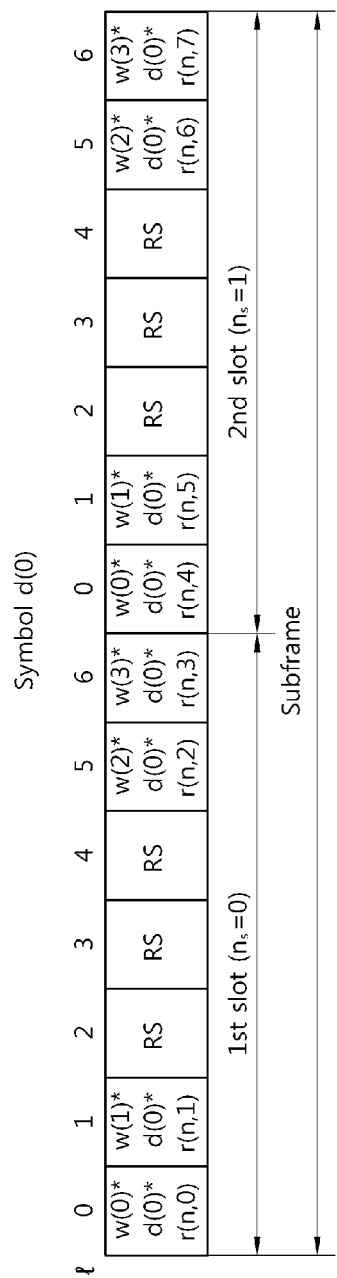
FIG. 8 shows an example of physical uplink control channel (PUCCH) format 1/1a/1b transmission if a normal cyclic prefix (CP) is used.

FIG. 8 shows an example of PUCCH format 1/1a/1b transmission if a normal CP is used. Herein, an RB pair allocated to a 1st slot and a 2nd slot in one subframe is shown. Here, the RBs belonging to the RB pair are shown to occupy the same frequency band in the 1st slot and 2nd slot, but as described above with reference to FIG. 7, the RBs may be hopped at a slot level.

Referring to FIG. 8, each of the 1st slot and the 2nd slot includes 7 OFDM symbols. Among the 7 OFDM symbols of each slot, a reference signal (RS) is carried in 3 OFDM symbols, and control information is carried in the remaining 4 OFDM symbols. The RS is carried in 3 contiguous OFDM symbols positioned in a middle portion of each slot. In this case, the position and the number of symbols used for the RS may vary, and thus the position and the number of symbols used for the control information may also vary.

Each of the PUCCH formats 1, 1a, and 1b uses one complex-valued symbol d(0). A

BS can detect an SR according to presence/absence of PUCCH format 1 transmission from a UE. Namely, an on-off keying (OOK) modulation scheme may be used for SR transmission. Thus, an arbitrary complex may be used as a value of a complex-valued symbol d(0) for a PUCCH format 1. For example, d(0)=1 may be used. The complex-valued symbol d(0) for a PUCCH format 1a is a modulation symbol generated as 1-bit HARQ ACK/NACK information is binary phase shift keying (BPSK) modulated. The complex-valued symbol d(0) for a PUCCH format 1b is a modulation symbol generated as 2-bit HARQ ACK/NACK information is quadrature phase shift keying (QPSK) modulated. The PUCCH format 1a is for HARQ ACK/NACK information regarding one codeword, and the PUCCH format 1b is for HARQ ACK/NACK information regarding two codewords.

The following table shows an example of modulation symbols to which HARQ ACK/NACK information bits are mapped according to modulation schemes.

TABLE 3

| Modulation scheme | Information bit(s) | d(0) |
|---|---|---|
| BPSK | 0 | 1 |
|  | 1 | −1 |
| QPSK | 00 | 1 |
|  | 01 | −j |
|  | 10 | j |
|  | 11 | −1 |

A modulated sequence s(n) is generated based on the complex-valued symbol d(0) for the PUCCH format 1/1a/1b and the cyclically shifted sequence r(n,Ics). The modulated sequence y(n) can be generated by multiplying the complex-valued symbol d(0) by the cyclically shifted sequence r(n,Ics) according to the following equation.

MathFigure 3

$$s(n)=d(0)r(n,I_{cs})$$ [Math. 3]

A CS index Ics of the cyclically shifted sequence r(n,Ics) may be hopped at a symbol level, starting from the allocated resources. Hereinafter, hopping of the CS index at the symbol level will be referred to as CS hopping. The CS hopping may be performed according to a slot number $n_s$ in a radio frame and a symbol index l in a slot. Thus, the CS index Ics can be expressed by Ics($n_s$,l). The CS hopping may be cell-specifically performed to randomize inter-cell interference. Herein, a slot number of the 1st slot is set to 0, a slot number of the 2nd slot is set to 1, and the CS indices are set to Ics(0,0)=0, Ics(0,1)=1, Ics(0,5)=2, Ics(0,6)=3, Ics(1,0)=4, Ics(1,1)=5, Ics(1,5)=6, and Ics(1,6)=7. However, this is for exemplary purposes only.

To increase UE multiplexing capacity, the modulated sequence s(n) can be spread by using an orthogonal sequence (OS). The UE multiplexing capacity is the number of UEs that can be multiplexed to the same RB.

Herein, the modulated sequence s(n) is spread with an OS w(k) having a spreading factor of K=4 with respect to 4 OFDM symbols for carrying a control signal within one slot. An OS $w_{I_{os}}(k)$ having a spreading factor of K=4 (where Ios is an OS index, and k satisfying 0≦k≦K−1 is an element index of the OS) can use a sequence shown in the following table.

TABLE 4

| Orthogonal sequence index | [w(0), w(1), w(2), w(3)] |
|---|---|
| 0 | [+1 +1 +1 +1] |
| 1 | [+1 −1 +1 −1] |
| 2 | [+1 −1 −1 +1] |

Elements constituting an OS correspond in a one-to-one manner to OFDM symbols in which control information is carried by turns. A spread sequence is generated by multiplying each of the elements constituting the OS by a modulated sequence s(n) carried in corresponding OFDM symbol. The spread sequence is mapped to the RB pair allocated to the PUCCH in the subframe. After the spread sequence is mapped to the RB pair, IFFT is performed on each OFDM symbol of the subframe to output a time domain signal with respect to the control information. Here, the OS is multiplied before IFFT is performed, but the same results can be obtained even if the OS is multiplied after IFFT is performed on the modulated sequence s(n).

Alternatively, an OS $w_{I_{os}}(k)$ having a spreading factor of K=3 (where Ios is an OS index, and k satisfying 0≦k≦K−1 is an element index of the OS) can use a sequence shown in the following table.

TABLE 5

| Orthogonal sequence index | [w(0), w(1), w(2)] |
|---|---|
| 0 | [1 1 1] |
| 1 | [1 $e^{j2\pi/3}$ $e^{j4\pi/3}$] |
| 2 | [1 $e^{j4\pi/3}$ $e^{j2\pi/3}$] |

If a sounding reference signal (SRS) and the PUCCH format 1/1a/1b are simultaneously transmitted in a subframe, one OFDM symbol on PUCCH is punctured. For example, the last OFDM symbol of the subframe may be punctured. In this case, control information is carried in 4 OFDM symbols in the 1st slot of the subframe, and control information is carried in 3 OFDM symbols in the 2nd slot of the subframe. Accordingly, an OS having a spread coefficient K=4 is used for the 1st slot, and an OS having a spread coefficient K=3 is used for the 2nd slot.

An OS index Ios may be hopped at a slot level, starting from allocated resources. Hereinafter, hopping of OS index at the slot level will be referred to as OS remapping. The OS remapping may be performed according to a slot number $n_s$ in a radio frame. Thus, the OS index Ios can be expressed as Ios($n_s$). The OS remapping may be performed to randomize inter-cell interference.

The modulated sequence s(n) may be scrambled in addition to being spread with the OS. For example, the modulated sequence y(n) may be multiplied by 1 or j according to a specific parameter.

The RS can be generated based on the OS and the cyclically shifted sequence generated from the same base sequence as the control information. The cyclically shifted sequence can be used as the RS by spreading the cyclically shifted sequence with the OS w(k) having a spreading factor of K=3. Therefore, in order for a UE to transmit control information, in addition to an OS index and a CS index for the control information, an OS index and a CS index for an RS are also required.

Figure 9:
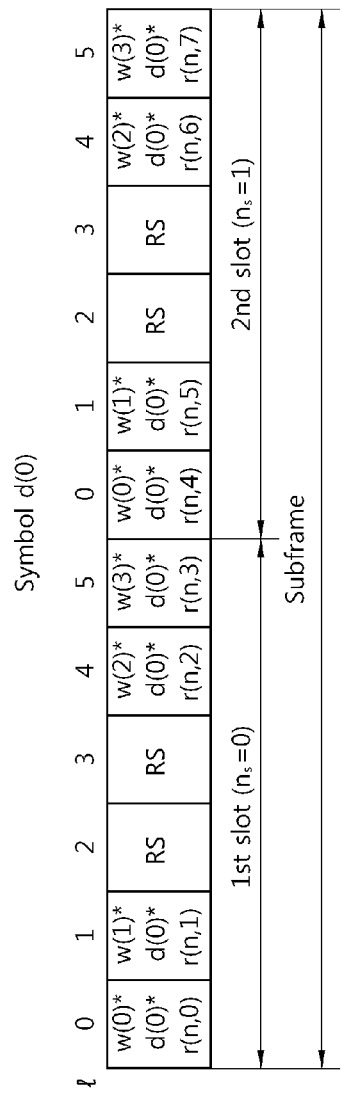
FIG. 9 shows an example of PUCCH format 1/1a/1b transmission when an extended CP is used.

FIG. 9 shows an example of PUCCH format 1/1a/1b transmission when an extended CP is used. Here, RBs belonging to an RB pair are shown to occupy the same frequency band in a 1st slot and a 2nd slot, but as described above with reference to FIG. 7, the RBs may be hopped at a slot level.

Referring to FIG. 9, each of the 1st slot and the 2nd slot includes 6 OFDM symbols. Among the 6 OFDM symbols of each slot, an RS is carried in 2 OFDM symbols, and control information is carried in the remaining 4 OFDM symbols. Other than that, the example of FIG. 8 in which the normal CP is used may be applied without alteration. However, the RS can be used by spreading the cyclically shifted sequence with the OS w(k) having a spreading factor of K=2.

An OS $w_{Ios}(k)$ having a spreading factor of K=2 (where Ios is an OS index, and k satisfying $0 \leq k \leq K-1$ is an element index of the OS) can use a sequence shown in the following table.

The UE performs channel coding on CQI information bits to generate coded CQI bits. In this case, a block code may be used. The block code may be, for example, a Reed-Muller code family. In the 3GPP LTE, a (20, A) block code is used. Here, 'A' is the size of the CQI information bits. Namely, in the 3GPP LTE, 20 coded CQI bits are always generated regardless of the size of the CQI information bits.

The following table shows an example of 13 basis sequences for the (20, A) block code.

TABLE 7

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ | $M_{i,11}$ | $M_{i,12}$ |
|---|---|---|---|---|---|---|---|---|---|---|---|---|---|
| 0 | 1 | 1 | 0 | 0 | 0 | 0 | 0 | 0 | 0 | 0 | 1 | 1 | 0 |
| 1 | 1 | 1 | 1 | 0 | 0 | 0 | 0 | 0 | 0 | 1 | 1 | 1 | 0 |
| 2 | 1 | 0 | 0 | 1 | 0 | 0 | 1 | 0 | 1 | 1 | 1 | 1 | 1 |
| 3 | 1 | 0 | 1 | 1 | 0 | 0 | 0 | 0 | 1 | 0 | 1 | 1 | 1 |
| 4 | 1 | 1 | 1 | 1 | 0 | 0 | 0 | 1 | 0 | 0 | 1 | 1 | 1 |
| 5 | 1 | 1 | 0 | 0 | 1 | 0 | 1 | 1 | 1 | 0 | 1 | 1 | 1 |
| 6 | 1 | 0 | 1 | 0 | 1 | 0 | 1 | 0 | 1 | 1 | 1 | 1 | 1 |
| 7 | 1 | 0 | 0 | 1 | 1 | 0 | 0 | 1 | 1 | 0 | 1 | 1 | 1 |
| 8 | 1 | 1 | 0 | 1 | 1 | 0 | 0 | 1 | 0 | 1 | 1 | 1 | 1 |
| 9 | 1 | 0 | 1 | 1 | 1 | 0 | 1 | 0 | 0 | 1 | 1 | 1 | 1 |
| 10 | 1 | 0 | 1 | 0 | 0 | 1 | 1 | 1 | 0 | 1 | 1 | 1 | 1 |
| 11 | 1 | 1 | 1 | 0 | 0 | 1 | 1 | 0 | 1 | 0 | 1 | 1 | 1 |
| 12 | 1 | 0 | 0 | 1 | 0 | 1 | 0 | 1 | 1 | 1 | 1 | 1 | 1 |
| 13 | 1 | 1 | 0 | 1 | 0 | 1 | 0 | 1 | 0 | 1 | 1 | 1 | 1 |
| 14 | 1 | 0 | 0 | 0 | 1 | 1 | 0 | 1 | 0 | 0 | 1 | 0 | 1 |
| 15 | 1 | 1 | 0 | 0 | 1 | 1 | 1 | 1 | 0 | 1 | 1 | 0 | 1 |
| 16 | 1 | 1 | 1 | 0 | 1 | 1 | 1 | 0 | 0 | 1 | 0 | 1 | 1 |
| 17 | 1 | 0 | 0 | 1 | 1 | 1 | 0 | 0 | 1 | 0 | 0 | 1 | 1 |
| 18 | 1 | 1 | 0 | 1 | 1 | 1 | 1 | 1 | 0 | 0 | 0 | 0 | 0 |
| 19 | 1 | 0 | 0 | 0 | 0 | 1 | 1 | 0 | 0 | 0 | 0 | 0 | 0 |

TABLE 6

| Orthogonal sequence index | [w(0), w(1)] |
|---|---|
| 0 | [1 1] |
| 1 | [1 −1] |
| 2 | N/A |

As described above, in case of the normal CP or the extended CP, the following information is required to transmit the PUCCH format 1/1a/1b: subcarriers (or an RB) on which control information is transmitted, a CS index Ics and an OS index Ios for the control information, and a CS index I'cs and an OS index I'os for an RS. For example, if the CS interval is 2 in the extended CP, the UE multiplexing capacity is as follows: Because the number of Ics is 6 and the number of Ios is 3 for the control information, 18 UEs per one RB can be multiplexed. Meanwhile, the number of I'cs is 6 and the number of I'os is 2 for the RS, twelve UEs per the one RB can be multiplexed. Thus, the UE multiplexing capacity is limited by the RS part, rather than the control information part.

Figure 10:
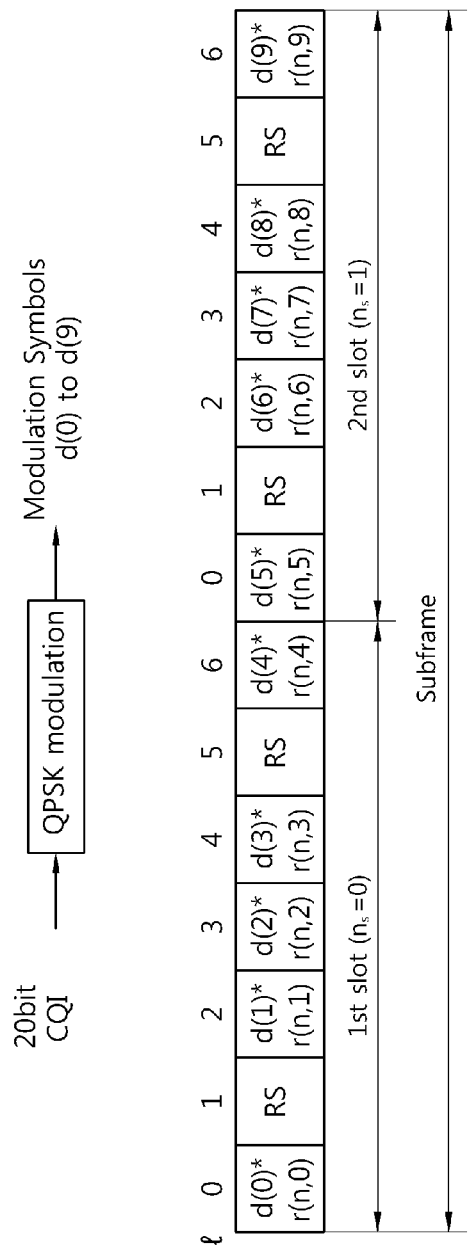
FIG. 10 shows an example of PUCCH format 2/2a/2b transmission when a normal CP is used.

FIG. 10 shows an example of PUCCH format 2/2a/2b transmission when a normal CP is used. Here, RBs belonging to an RB pair are shown to occupy the same frequency band in a 1st slot and a 2nd slot, but as described above with reference to FIG. 7, the RBs may be hopped at a slot level.

Referring to FIG. 10, among 7 OFDM symbols included in each slot, an RS is carried in 2 OFDM symbols, and a CQI is carried in the remaining 5 OFDM symbols. In this case, the position and the number of symbols used for the RS may differ, and thus the position and the number of symbols used for the CQI may also differ.

Here, $M_{i,n}$ is a basis sequence ($0 \leq n \leq 12$, where n is integer). The coded CQI bits are generated through a linear combination of the 13 basis sequences. The following equation shows an example of the coded CQI bits $b_i$ ($0 \leq i \leq 19$, where i is integer).

MathFigure 4

$$b_i = \sum_{n=0}^{A-1} (a_n \cdot M_{i,n}) \bmod 2 \qquad \text{[Math. 4]}$$

Here, $a_0, a_1, \ldots, a_{A-1}$ are CQI information bits, and A is the size of the CQI information bits (where A is natural number).

The CQI information bits may include one or more fields. For example, the CQI information bits may include a CQI field indicating a CQI index that determines an MCS, a precoding matrix indication (PMI) field indicating an index of a precoding matrix selected from a codebook, a rank indication (RI) field indicating a rank, and the like.

The following table shows an example of a field included in the CQI information bits and a bit size of the field.

TABLE 8

| Field | Size (bit) |
|---|---|
| Wideband CQI | 4 |

The CQI information bits may include only 4-bit wideband CQI field. In this case, the size A of the CQI information bits is 4. The wideband CQI field indicates a CQI index with respect to the entire band.

The following table shows another example of fields included in the CQI information bits and a bit size of the fields.

TABLE 9

| Field | Size (bit) | | | |
|---|---|---|---|---|
| | 2 antennas | | 4 antennas | |
| | Rank = 1 | Rank = 2 | Rank = 1 | Rank > 1 |
| Wideband CQI | 4 | 4 | 4 | 4 |
| Spatial differential CQI | 0 | 3 | 0 | 3 |
| Precoding matrix indication | 2 | 1 | 4 | 4 |

The CQI information bits may include the wideband CQI field, a spatial differential CQI field, and a PMI field. The spatial differential CQI field indicates the difference between a CQI index with respect to the entire band for a 1st codeword and a CQI index with respect to the entire band for a 2nd codeword. The size of each field may vary depending on the number of transmit antennas of the BS and rank. For example, if the BS uses 4 transmit antennas and the rank is larger than 1, the CQI information bits include 4-bit wideband CQI field, 3-bit spatial differential CQI field, and 4-bit PMI field (A=11).

The following table shows still another example of a field included in the CQI information bits and a bit size of the field.

TABLE 10

| Field | Size (bit) | | |
|---|---|---|---|
| | 2 antennas | 4 antennas | |
| | | Max 2 layers | Max 4 layers |
| Rank indication | 1 | 1 | 2 |

20 coded CQI bits may be scrambled with a UE-specific scrambling sequence to generate 20 scrambled bits. The 20 scrambled bits are mapped to 10 complex-valued modulation symbols d(0) to d(9) by QPSK modulation. In the PUCCH format 2a, 1-bit HARQ ACK/NACK information is mapped to one complex-valued modulation symbol d(10) by BPSK modulation. In the PUCCH format 2b, 2-bit HARQ ACK/NACK information is mapped to one complex-valued modulation symbol d(10) by QPSK modulation. Namely, in the PUCCH format 2a, the CQI and the 1-bit HARQ ACK/NACK information are simultaneously transmitted, and in the PUCCH format 2b, the CQI and the 2-bit HARQ ACK/NACK information are simultaneously transmitted. Here, d(10) is used in the generation of the RS. The d(10) corresponds to one OFDM symbol between 2 OFDM symbols in which the RS is carried in each slot. In other words, phase modulation is performed on 2nd RS carried in the one OFDM symbol in each slot according to corresponding d(10). The PUCCH format 2a/2b can be supported for normal CP only. As such, in each of the PUSCH formats 2a and 2b, one complex-valued modulation symbol is used to generate the RS.

A modulated sequence is generated based on the complex-valued modulation symbols d(0) to d(9) and the cyclically shifted sequence r(n,Ics) generated from the base sequence. A CS index Ics of the cyclically shifted sequence r(n,Ics) may differ according to a slot number $n_s$ in a radio frame and a symbol index l in a slot. Therefore, the CS index Ics can be expressed by Ics($n_s$,l). Herein, a slot number of a 1st slot is set to 0, a slot number of a 2nd slot is set to 1, and the CS indices are set to Ics(0,0)=0, Ics(0,2)=1, Ics(0,3)=2, Ics(0,4)=3, Ics(0,6)=4, Ics(1,0)=5, Ics(1,2)=6, Ics(1,3)=7, Ics(1,4)=8, and Ics(1,6)=9. However, this is for exemplary purposes only. The RS can use the cyclically shifted sequence generated from the same base sequence as the control information.

Unlike in the PUCCH format 1/1a/1b, the PUCCH format 2/2a/2b does not use an OS.

Figure 11:
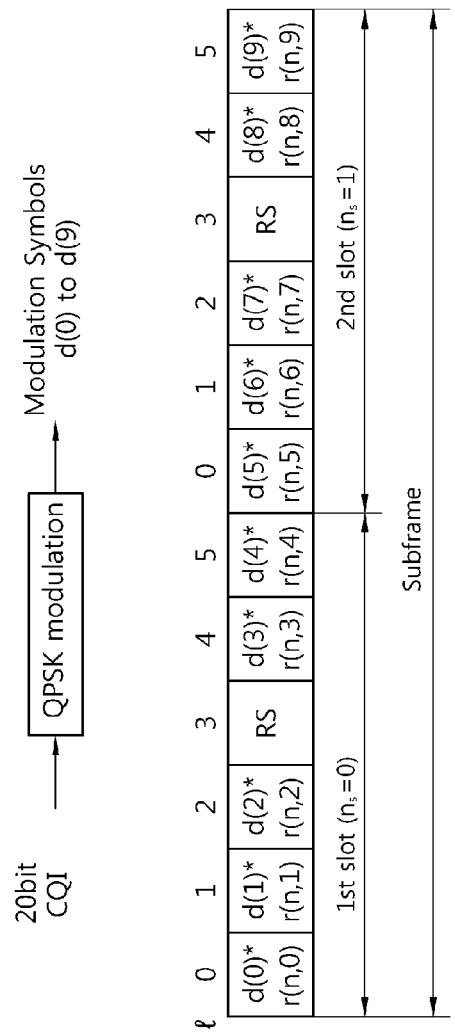
FIG. 11 shows an example of PUCCH format 2/2a/2b transmission when an extended CP is used.

FIG. 11 shows an example of PUCCH format 2/2a/2b transmission when an extended CP is used. Here, RBs belonging to an RB pair are shown to occupy the same frequency band in a 1st slot and a 2nd slot, but as described above with reference to FIG. 7, the RBs may be hopped at a slot level.

Referring to FIG. 11, each of the 1st slot and the 2nd slot includes 6 OFDM symbols.

Among the 6 OFDM symbols of each slot, an RS is carried in one OFDM symbol, and control information is carried in the remaining 5 OFDM symbols. Other than that, the example of FIG. 10 in which the normal CP is used may be applied without alteration.

As described above, in case of the normal CP or the extended CP, the following information is required to transmit the PUCCH format 2/2a/2b: subcarriers (or an RB) on which control information is transmitted, a CS index Ics for the control information, and a CS index I'cs for an RS. For example, if the CS interval is 1, each of the number of Ics for the control information and the number of I'cs for the RS is 12, and 12 UEs per one RB can be multiplexed. If the CS interval is 2, each of the number of Ics for the control information and the number of I'cs for the RS is 6, and 6 UEs per one RB can be multiplexed.

Figure 12:
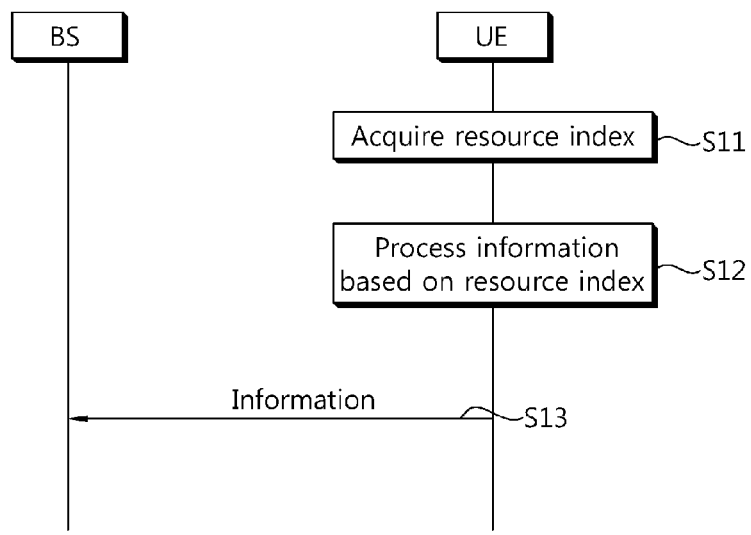
FIG. 12 is a flow diagram showing an example of a method of transmitting information.

FIG. 12 is a flow diagram showing an example of a method of transmitting information.

Referring to FIG. 12, a UE acquires a resource index (S11). The UE processes information based on the resource index (S12). The UE transmits the information to a BS (S13).

A plurality of UEs in a cell can simultaneously transmit respective information to the BS. In this case, if each UE uses a mutually different resource, the BS could discriminate the information of each UE.

The resource may include one or more of an RB, a frequency domain sequence, and a time domain sequence. The RB is a frequency resource on which the information is transmitted. The frequency domain sequence is used to spread symbol corresponding to the information in a frequency domain. The time domain sequence is used to spread the symbol in a time domain. If the resource includes the frequency domain sequence and the time domain sequence, the frequency domain sequence and the time domain sequence are used to spread the symbol in a two-dimensional time-frequency domain (frequency domain and time domain).

The resource index identifies the resource used for information transmission. The resource index may include one or more of RB information, a frequency domain sequence index, and a time domain sequence index. The RB information indicates the RB, the frequency domain sequence index indicates the frequency domain sequence, and the time domain sequence index indicates the time domain sequence. For example, if a resource includes an RB and a frequency domain sequence, a resource index may include RB information and a frequency domain sequence index.

A sequence used as the frequency domain sequence and/or time domain sequence will now be described. The sequence can be selected from a sequence set including a plurality of sequences as elements. The plurality of the sequences included the sequence set may be mutually orthogonal, or have low correlation with one another.

If a resource includes a sequence, a resource index may include a sequence index. The sequence may be generated based on the sequence index. Hereinafter, the sequence is a frequency domain sequence and/or a time domain sequence.

For example, the sequence index may indicate one sequence selected from the sequence set. Each of the plurality of the sequences included the sequence set may correspond to one sequence index in a one-to-one manner.

For another example, the sequence index may indicate a CS amount, and the sequence may be generated by cyclically shifting a base sequence by the CS amount.

Hereinafter, it is assumed that the time domain sequence is an OS selected from a set of OSs and the frequency domain sequence is a cyclically shifted sequence generated by cyclically shifting a basis sequence by a CS amount. In this case, a time domain sequence index may be an OS index indicating the OS, and a frequency domain sequence index may be a CS index indicating the CS amount. However, this is merely illustrative, and the time domain sequence and/or the frequency domain sequence are not limited.

In case of the PUCCH format 1/1a/1b, a resource may be constituted as a combination of (1) a CS amount, (2) an OS, and (3) an RB. A resource index indicates a CS index, an OS index, and the RB. For example, if the number of CS indices is 6, the number of OS indices is 3, and the number of RBs is 3, then the total number of resources would be 54 (=6×3×3). The 54 resources can be indexed from 0 to 53. Each of the 54 resources can be allocated to mutually different UEs.

In case of the PUCCH format 2/2a/2b, a resource may be constituted as a combination of (1) a CS amount, and (2) an RB. A resource index indicates a CS index and the RB. For example, if the number of CS indices is 6 and the number of RBs 2, then the total number of resources would be 12 (=6×2). The 12 resources can be indexed from 0 to 11. Each of the 12 resources can be allocated to mutually different UEs.

In this manner, the CS index and the RB are determined from the resource index. In case of the PUCCH format 1/1a/1b, the OS index is also determined from the resource index. For example, a location index m indicating a logical frequency domain location of an RB pair allocated to a PUCCH in a subframe can be determined from the resource index.

Figure 13:
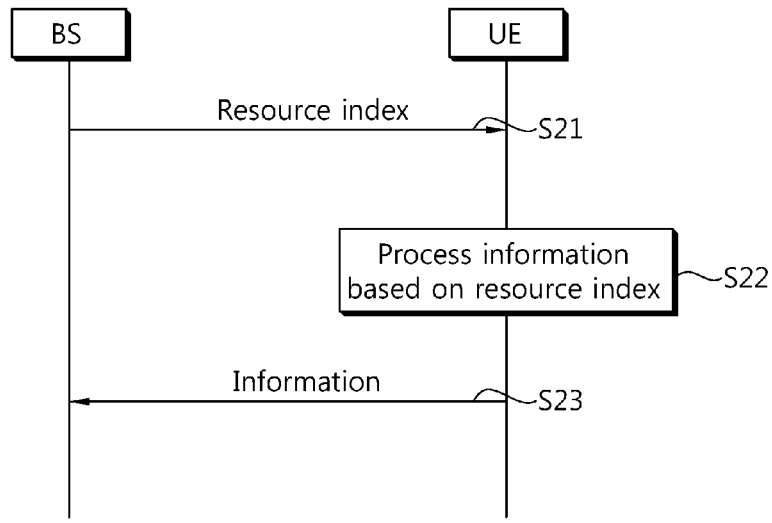
FIG. 13 is a flow diagram showing another example of a method of transmitting information.

FIG. 13 is a flow diagram showing another example of a method of transmitting information.

Referring to FIG. 13, a BS transmits a resource index to a UE (S21). The UE processes information based on the resource index (S22). The UE transmits the information to the BS (S23). As such, the BS can explicitly inform the UE of the resource index. The resource index may be configured by higher layer signaling. For example, the higher layer of a physical layer may be a radio resource control (RRC) layer controlling radio resources between the UE and a network. In this case, the information transmitted by the UE may be an SR, a semi-persistent scheduling (SPS) ACK/NACK, a CQI, and the like. The SPS ACK/NACK is an HARQ ACK/NACK with respect to DL data transmitted according to semi-static scheduling. If the DL data is transmitted on a PDSCH, a PDCCH corresponding to the PDSCH may not exist.

Figure 14:
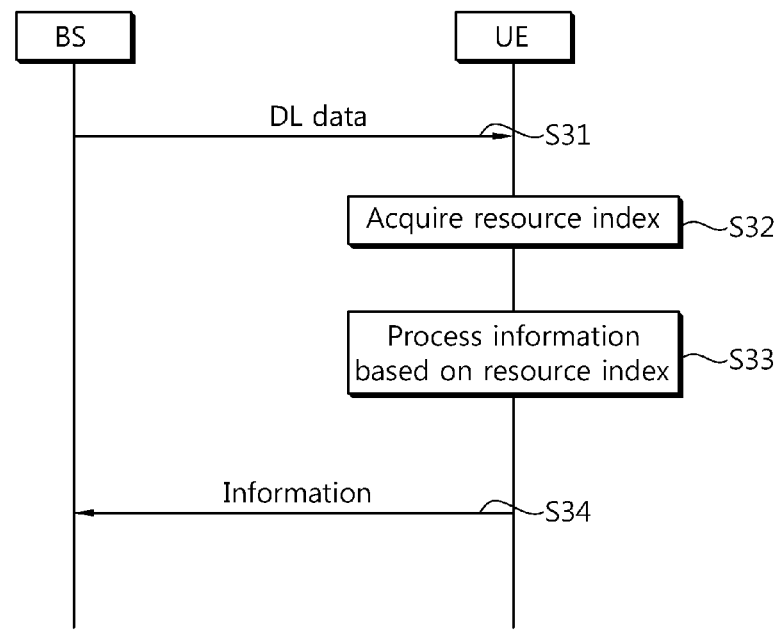
FIG. 14 is a flow diagram showing still another example of a method of transmitting information.

FIG. 14 is a flow diagram showing still another example of a method of transmitting information.

Referring to FIG. 14, a BS transmits DL data to a UE (S31). The UE acquires a resource index (S32). In this case, the resource index can be obtained from a radio resource on which a control channel for receiving the DL data is transmitted. The UE processes information based on the resource index (S33). The UE transmits the information to the BS (S34). As such, the BS can implicitly inform the UE of the resource index. In this case, the information transmitted by the UE is a dynamic ACK/NACK. The dynamic ACK/NACK is an HARQ ACK/NACK with respect to DL data transmitted according to dynamic scheduling. The dynamic scheduling is that whenever the BS transmits the DL data on a PDSCH, it transmits a DL grant to the UE on the PDCCH.

The following equation shows an example of determining a resource index (In) for transmission of the dynamic ACK/NACK.

MathFigure 5

$$In = n(CCE) + N_{PUCCH}^{(1)}$$ [Math. 5]

Here, n(CCE) is the first CCE index used for PDCCH transmission with respect to the PDSCH, and $N^{(1)}_{PUCCH}$ is the number of resource indices allocated for an SR and an SPS ACK/NACK. $N^{(1)}_{PUCCH}$ can be configured by a higher layer such as an RRC layer.

Accordingly, the BS can adjust a resource for ACK/NACK transmission by adjusting the first CCE index used for the PDCCH transmission.

Figure 15:
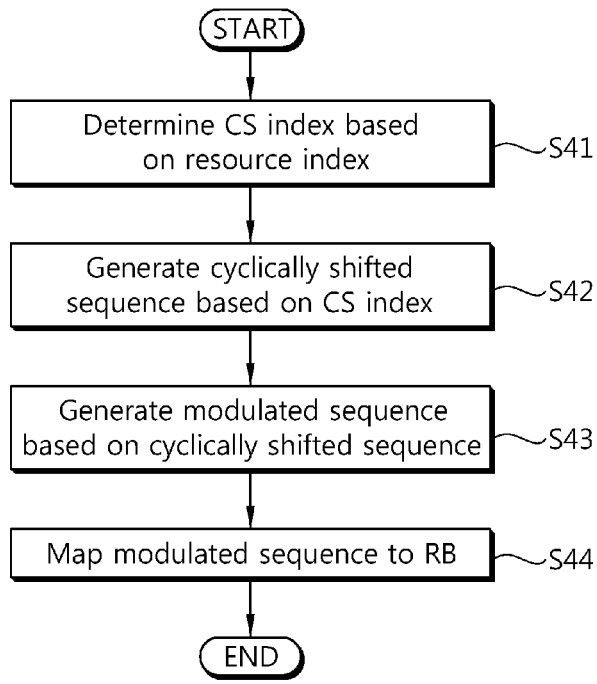
FIG. 15 is a flow chart showing an example of a method of processing information based on a resource index.

FIG. 15 is a flow chart showing an example of a method of processing information based on a resource index.

Referring to FIG. 15, a UE determines a CS index based on a resource index (S41). The UE generates a cyclically shifted sequence based on the CS index (S42). The cyclically shifted sequence can be generated by cyclically shifting a basis sequence by a CS amount obtained from the CS index. The UE generates a modulated sequence based on the cyclically shifted sequence and a symbol for information (S43). The UE maps the modulated sequence to an RB (S44). The RB can be determined based on the resource index. The UE transmits the modulated sequence. In this case, the information transmitted by the UE may be a CQI.

Figure 16:
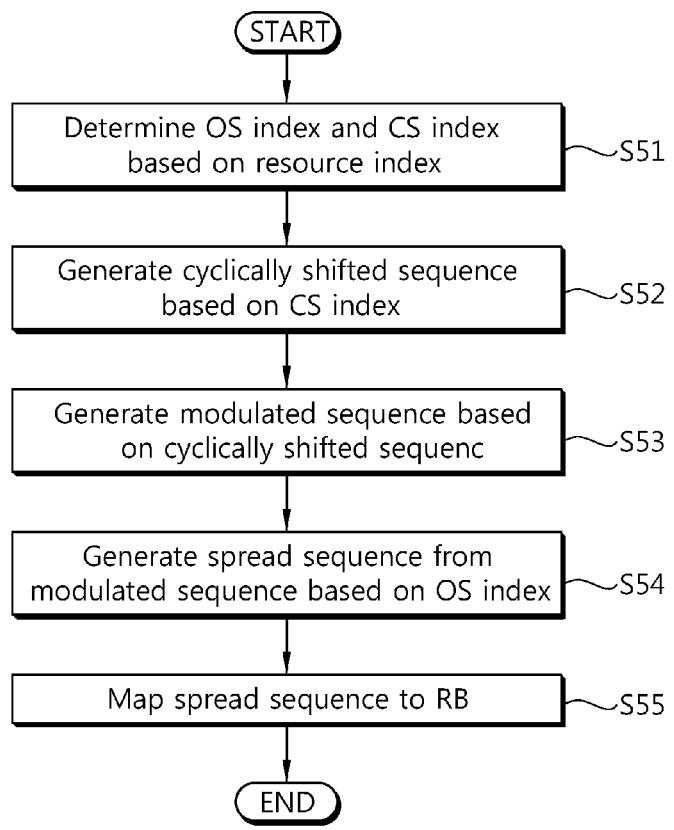
FIG. 16 is a flow chart showing another example of the method of processing information based on a resource index.

FIG. 16 is a flow chart showing another example of the method of processing information based on a resource index.

Referring to FIG. 16, a UE determines an OS index and a CS index based on a resource index (S51). The UE generates a cyclically shifted sequence based on the CS index (S52). The UE generates a modulated sequence based on the cyclically shifted sequence and a symbol for information (S53). The UE generates a spread sequence from the modulated sequence based on the OS index (S54). The UE maps the spread sequence to a RB (S55). The RB can be determined based on the resource index. The UE transmits the spread sequence. In this case, the information transmitted by the UE may be an SR, an HARQ ACK/NACK, etc.

As described so far, the UL information of each of a plurality of UEs in a cell can be multiplexed in a subframe according to the code division multiplexing (CDM) and/or frequency division multiplexing (FDM) scheme, and transmitted. The each of the plurality of UEs may simultaneously transmit information to the BS by using a mutually different resource. The BS can discriminate the information of each UE which has been transmitted concurrently from each UE.

The UEs may transmit the information through a plurality of transmit antennas. A transmit diversity scheme, among MIMO techniques, has a diversity gain and can increase the reliability of wireless communication. The transmit diversity scheme includes, for example, cyclic delay diversity (CDD), precoding vector switching (PVS), single carrier space-frequency block coding (SC-SFBC), space-time block coding (STBC), and the like. However, if these schemes are in use, a problem arises in that the orthogonality is not maintained, the transmit diversity gain is limited, or backward compatibility with the 3GPP LTE is not satisfied. Thus, a method of transmitting information using a transmit diversity scheme that can solve the problems needs to be provided.

In addition, if the information transmission method described so far is in use, 2-bit HARQ ACK/NACK information with respect to 2 codewords or 20 coded CQI bits may be transmitted. In this respect, a method for transmitting additional information while maintaining compatibility with 3GPP LTE is required. For example, if the number of codewords increases, or in case of a multi-carrier system, additional information must be transmitted. For example, if there are four codewords, a method for transmitting 4-bit HARQ ACK/NACK information may be required. Also, for a carrier aggregation system including 2 DL and 1 UL (2DL-1UL), the method for transmitting 4-bit HARQ ACK/NACK information may be required.

Figure 17:
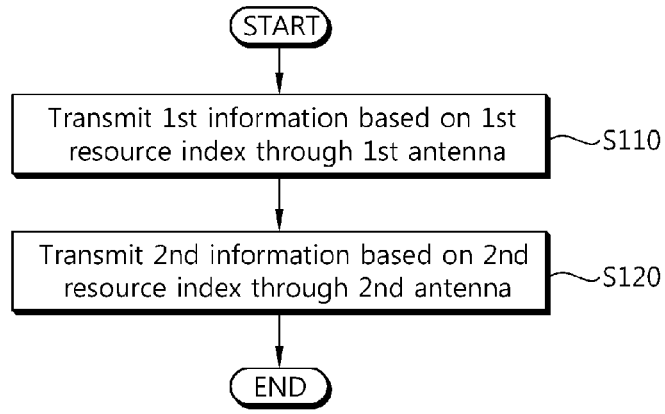
FIG. 17 is a flow chart showing a method of transmitting information according to an embodiment of the present invention.

FIG. 17 is a flow chart showing a method of transmitting information according to an embodiment of the present invention.

Referring to FIG. 17, a transmitter transmits first information based on a first resource index through a first antenna during a first interval (S110). The transmitter transmits second information based on a second resource index through a second antenna during a second interval (S120). The first interval is a time interval during which information is transmitted. For example, the first interval may be a slot, an OFDM symbol, or the like. The first information and the second information are simultaneously transmitted. The first resource index is allocated for transmission of the first information, and the second resource index is allocated for transmission of the second information. The first resource index and the second resource index may be different from each other. If the first resource index and the second resource index are different, an orthogonality between the transmit antennas can be maintained. Two resources may be allocated to an RS part for a channel estimation of each of the first antenna and the second antenna.

The information transmission method of FIG. 17 may be extendedly applied for three or more transmission antennas. If the UE intends to transmit N number of information through N number of transmission antennas, it can be allocated N number of mutually different resource indexes for each of the N number of transmission antennas (where N is natural number of 2 or larger). The UE may transmit each of the N number of information based on each resource index through each transmission antenna. The RS may be transmitted by each transmission antenna for channel estimation of each antenna, and N number of resources may be allocated for RS transmission. Namely, the number of resources allocated to the UE for information transmission and for the RS transmission may be the same.

Figure 18:
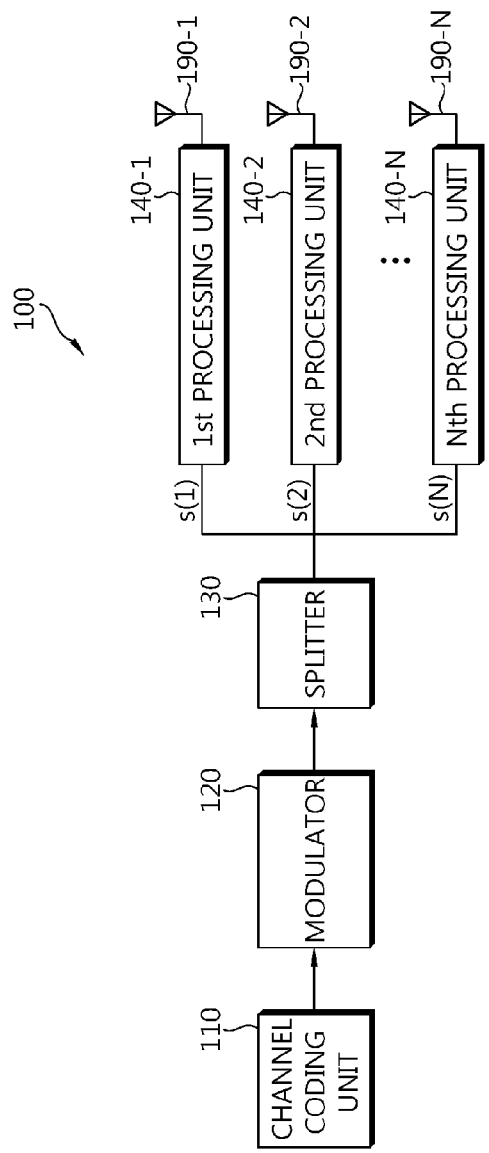
FIG. 18 is a block diagram showing an example of a transmitter structure.

FIG. 18 is a block diagram showing an example of a transmitter structure. Here, the transmitter may be a part of the UE or the BS.

Referring to FIG. 18, the transmitter 100 includes a channel coding unit 110, a modulator 120, a splitter 130, N number of processing units 140-1, . . . , 140-N (N is a natural number of 2 or larger), and N number of transmission antennas 190-1, . . . , 190-N. The (nr)th processing unit 140-$nr$ is coupled with the (nr)th transmission antenna 190-($nr$) (nr=1, . . . , N). The channel coding unit 110 performs channel coding on a information bit to generate coded bits. The coded bits may be a codeword. The modulator 120 modulates the coded bits to generate modulation symbols. There is not limitation in the modulation scheme, and the modulation scheme may be m-phase shift keying (m-PSK) or m-quadrature amplitude modulation (m-QAM). M×N number of modulation symbols are generated through the modulator 120 (M is a natural number). For example, in a PUCCH format 1/1a/1b, M is 1, and in a PUCCH format 2/2a/2b, M is 10. The splitter 130 splits N number of information (s(1), s(2), . . . , s(N)) based on the M×N number of modulation symbols and input the (nr)th information s((nr)th) to the (nr)th processing unit 140-$nr$. The (nr)th processing unit 140-$nr$ processes the (nr)th information based on the (nr)th resource index to generate the (nr)th control signal. Namely, resource index is allocated to each of the N number of information. The (nr)th control signal may be transmitted through the (nr)th transmission antenna 190-($nr$).

Figure 19:
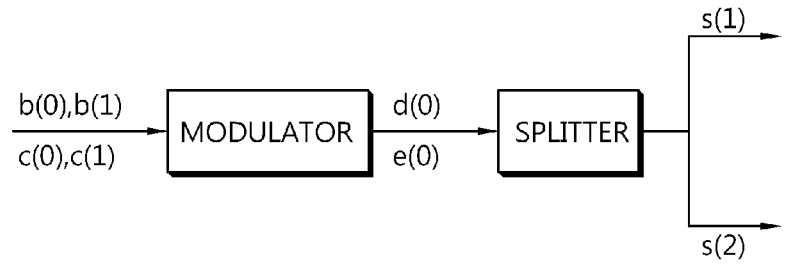
FIG. 19 shows an example of the modulation process.

FIG. 19 shows an example of the modulation process.

Referring to FIG. 19, 2-bit first coded bits (b(0), b(1)) and 2-bit second coded bits (c(0), c(1)) are inputted to the modulator. The first coded bits may be a first ACK/NACK with respect to first data which has been transmitted through a first downlink carrier, and the second coded bits may be a second ACK/NACK with respect to second data transmitted through a second downlink carrier. The modulator performs QPSK modulation on the first coded bits to generate a first modulation symbol d(0), and performs QPSK modulation on the second coded bits to generate a second modulation symbol e(0). Otherwise, the modulator may permutate the first coded bits and the second coded bits, and modulate bits which have been permutated. For example, the modulator may perform permutation by swapping the first bits (b(0), c(0)) of the first coded bits and the second coded bits. The modulator may modulate the bits c(0) and b(1) to generate the first modulation symbol d(0), and modulate the bits b(0) and c(1) to generate the second modulation symbol e(0).

The splitter splits the first modulation symbol d(0) and the second modulation symbol e(0) into first information item s(1) and second information s(2). For example, the first modulation symbol may correspond to the first information, and the second modulation symbol may correspond to the second information. For another example, the first and second modulation symbols may be permutated and/or mixed and split into first and second information.

The following equation shows the first modulation symbol d(0) and the second modulation symbol e(0) are permutated and/or mixed and split into the first information s(1) and the second information s(2).

MathFigure 6

$$s(1)=d(0)+e(0), s(2)=d(0)-e(0)$$

$$s(1)=d(0)-e(0)^*, s(2)=e(0)+d(0)^* \qquad [\text{Math. 6}]$$

Otherwise, the first modulation symbol d(0) or the second modulation symbol e(0) may be rotated by a certain phase and then permutated and/or mixed so as to be split into the first information s(1) and the second information s(2) such as the following equation.

MathFigure 7

$$s(1)=d(0)+e(0)e^{ja}, s(2)=d(0)-e(0)e^{jb}$$

$$s(1)=d(0)-e(0)^*e^{ja}, s(2)=e(0)+d(0)^*e^{jb} \qquad [\text{Math. 7}]$$

Here, a and b may be the same or different.

Channel coding and modulation process of the transmitter on the assumption that M is 10 and R is 2 will now be described in detail in FIGS. 20 and 21.

Figure 20:
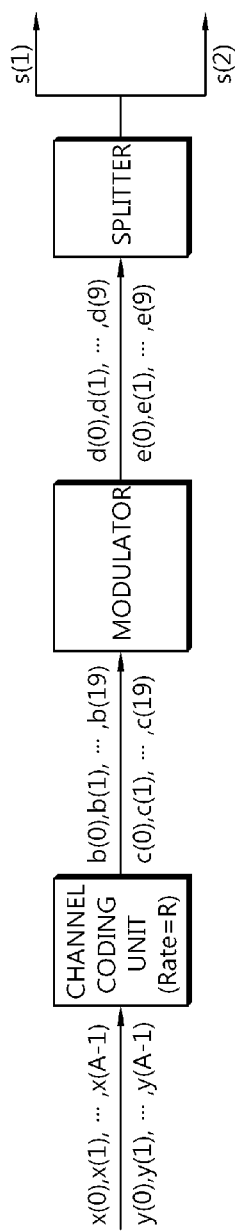
FIG. 20 shows one example of a channel coding and modulation process of the transmitter.

FIG. 20 shows one example of a channel coding and modulation process of the transmitter.

Referring to FIG. 20, A-bit first information bits (x(0), x(1), . . . , x(A−1)) and A-bit second information bits (y(0), y(1), . . . , y(A−1)) are inputted to the channel coding unit. The second information bits may be inputted to the channel coding unit after completion of channel coding of the first information bits. The channel coding unit performs channel coding on the first information bits to generate 20-bit first coded bits (b(0), b(1), ..., b(19)), and performs channel coding on the second information bits to generate 20-bit second coded bits (c(0), c(1), ..., c(19)). Namely, channel coding is performed on each of the first and second information bits to generate two codewords. The coding rate is R=A/20.

The 20-bit first coded bits and the 20-bit second coded bits are inputted to the modulator. The second coded bits may be inputted after the first coded bits are inputted. Otherwise, the first and second coded bits may be permutated. The modulator performs QPSK modulation on the first coded bits to generate first modulation symbols (d(0), d(1), ..., d(9)), and performs QPSK modulation on the second coded bits to generate second modulation symbols (e(0), e(1), ..., e(9)).

The splitter splits the first modulation symbols and the second modulation symbols into first information s(1) and second information s(2). The first modulation symbol may correspond to the first information s(1), and the second modulation symbol may correspond to the second information s(2). Namely, the first information may correspond to the first codeword generated by channel coding the first information bits, and the second information may correspond to the second codeword generated by channel coding the second information bits. Otherwise, the first modulation symbols and the second modulation symbols may be permutated and/or mixed so as to be split into the first and second information.

Figure 21:
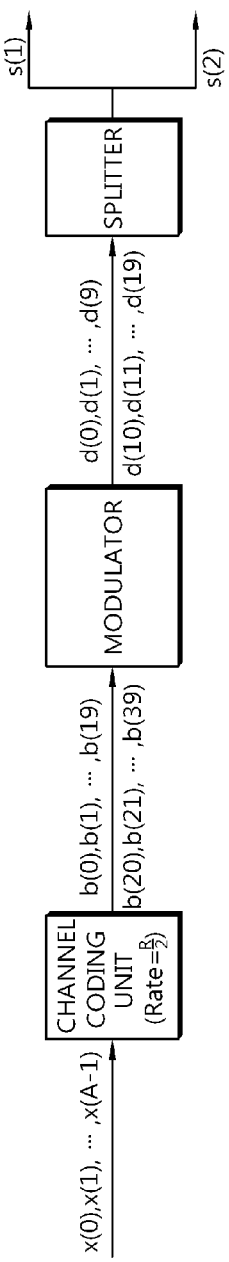
FIG. 21 shows another example of the channel coding and modulation process of the transmitter.

FIG. 21 shows another example of the channel coding and modulation process of the transmitter.

Referring to FIG. 21, A-bit information bits (x(0), x(1), ..., x(A−1)) are inputted to the channel coding unit. The channel coding unit performs channel coding on the information bits to generate 40-bit coded bits (b(0), b(1), ..., b(39)). Namely, channel coding is performed on the information bits to generate one codeword. The coding rate is R/2=A/40. The modulator performs QPSK modulation on the coded bits to generate 20 modulation symbols (d(0), d(1), ..., d(19)). The splitter splits the modulation symbols into first information s(1) and second information s(2). For example, the modulation symbols d(0), d(1), ..., d(9) may correspond to the first information s(1), and the modulation symbols d(10), d(11), ..., d(19) may correspond to the second information s(2). Namely, the first information corresponds to some bits of one codeword generated by channel coding the information bits, and the second information corresponds to the other remaining bits of the codeword.

As shown in FIG. 21, the channel coding scheme in which the information bits are channel coded at the coding rate of R/T to generate one codeword and the other portions of the codeword are transmitted through a different transmission antenna is called joint coding. In this case, R is a coding rate in case of one transmission antenna, and T is the number of transmission antennas. Unlike the case of FIG. 21, in FIG. 20, a channel coding scheme in which the same number of codewords as the number of transmission antennas are generated is used.

An information transmission method will now be described in detail.

First, an information transmission method employing the PUCCH format 1/1a/1b will now be described. A resource used for information transmission may be constituted as a combination of (1) a CS amount, (2) an OS, and (3) an RB. In this case, each resource index may indicate a CS index, an OS index, and an RB. In this case, a first resource index indicates a first CS index, a first OS index, and a first RB, and a second resource index indicates a second CS index, a second OS index, and a second RB.

The first information may be a first ACK/NACK with respect to first data received by the UE through a first downlink carrier, and the second information may be a second ACK/NACK with respect to second data received by the UE through a second downlink carrier. Otherwise, the first information may be a first ACK/NACK with respect to two codewords, and the second information may be a second ACK/NACK with respect to another two codewords. Each modulation symbol of the first and second information may be a modulation symbol obtained by performing BPSK modulation on 1-bit HARQ ACK/NACK information, or a modulation symbol obtained by performing QPSK modulation on 2-bit HARQ ACK/NACK information. The UE may further include receiving each downlink data from the BS. The first resource index is acquired from a radio resource for a physical control channel to receive the first data, and the second resource index is acquired from a radio resource for a physical control channel to receive the second data.

Each information may be processed by using each resource index according to the PUCCH format 1/1a/1b. The UE may generate a first cyclically shifted sequence by cyclically shifting a base sequence by a first CS amount obtained from the first CS index, generate a first modulated sequence based on the first cyclically shifted sequence and the first modulation symbol with respect to the first information, generate a first spread sequence from the first modulated sequence based on the first OS index, and transmit the first spread sequence through the first antenna after mapping the first spread sequence to the first RB. Also, the UE may generate a second cyclically shifted sequence by cyclically shifting the base sequence by a second CS amount obtained from the second CS index, generate a second modulated sequence based on the second cyclically shifted sequence and the second modulation symbol with respect to the second information, generate a second spread sequence from the second modulated sequence based on the second OS index, and transmit the second spread sequence through the second antenna after mapping the second spread sequence to the second RB. In this case, the first spread sequence and the second spread sequence may be simultaneously transmitted.

The (nr)th spread sequence transmitted through the (nt)th transmission antenna will be represented as z{nr,nt}. The (nr)th spread sequence is a sequence generated based on the (nr)th resource index and the (nr)th information. z{nr,nt} may be represented by the following equation.

MathFigure 8

$$z\{nr,nt\}(k,n+R_{nr}) = w_{nr}(k)d_{nr}(0)r(n,Ics^{nr})  \quad [\text{Math. 8}]$$

Here, k is a symbol index of an OFDM symbol within the (nr)th RB. Excluding an OFDM symbol in which the RS is carried, k may be 0, 1, 2, and 3. $R_{nr}$ is a frequency position offset of the (nr)th RB, and n is a subcarrier index within the (nr)th RB (n=0, 1, ..., 11). $w_{nr}(k)$ is the kth element of the (nr)th OS index, $d_{nr}(0)$ is the (nr)th modulation symbol with respect to the (nr)th information, $Ics^{nr}$ is the (nr)th CS index, and $r(n,Ics^{nr})$ is the (nr)th cyclically shifted sequence.

Figure 22:
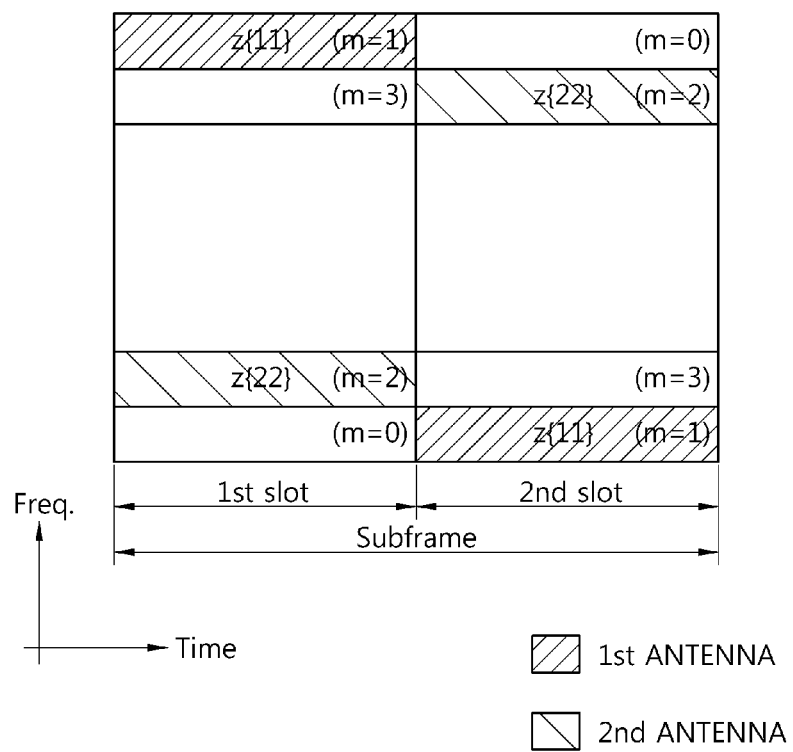
FIG. 22 shows transmission of information employing the PUCCH format 1/1a/1b.

FIG. 22 shows transmission of information employing the PUCCH format 1/1a/1b.

Referring to FIG. 22, z{11} is the first spread sequence transmitted through the first antenna, and z{22} is the second spread sequence transmitted through the second antenna. During the first slot in a subframe, the first spread sequence is transmitted through the first antenna, and the second spread sequence is transmitted through the second antenna. In addition, during the second slot in the subframe, the first spread sequence is transmitted through the first antenna, and the second spread sequence is transmitted through the second antenna. Here, the first resource index indicates a RB pair of m=1, and the second resource index indicates a RB pair of m=2, but these are merely illustrative.

Figure 23:
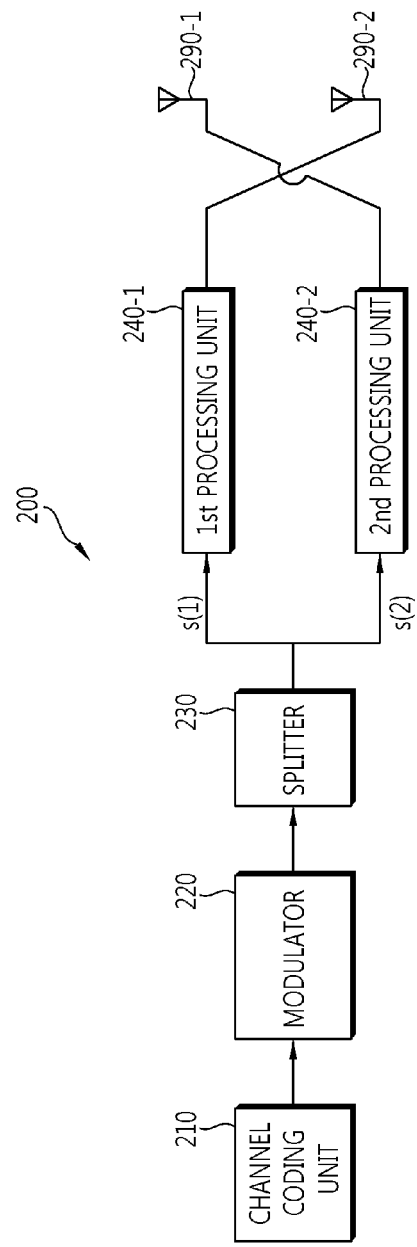
FIG. 23 is a block diagram showing another example of a transmitter structure.

FIG. 23 is a block diagram showing another example of a transmitter structure. Here, the transmitter may be a part of the UE or the BS.

Referring to FIG. 18, the transmitter 200 includes a channel coding unit 210, a modulator 220, a splitter 230, two processing units 240-1 and 240-2, and two transmission antennas 290-1 and 290-2. The first processing unit 240-1 is coupled with the second transmission antenna 290-2, and the second processing unit 240-2 is coupled with the first transmission antenna 290-1.

In order to maximize a diversity gain, a transmission antenna through which information is transmitted by the particular time interval may be changed. The particular time interval unit may be a slot, an OFDM symbol, and the like. For example, during the first interval, first information is transmitted based on first resource index through the first transmission antenna and second information is transmitted to based on second resource index through the second transmission antenna. During the second interval, first information is transmitted based on the first resource index through the second transmission antenna, and second information is transmitted based on the second resource index through the first transmission antenna.

In case of two transmission antennas, changing of the transmission antenna for information transmission is the same as an antenna exchanging operation. In case of N number of transmission antennas, the transmitter may change one or more of the N number of transmission antennas to transmit information. In case of two or more time intervals, the N number of transmission antennas may be shifted in a cyclic form. For example, during the first time interval, first information is transmitted through the first transmission antenna, the second information is transmitted through the second transmission, . . . , and the Nth information is transmitted through the Nth transmission antenna. During the second time interval, the Nth information may be transmitted through the first transmission antenna, the first information may be transmitted through the second transmission, . . . , and the (N−1)th information may be transmitted through the Nth transmission antenna. If the antenna for information transmission is changed, resources which have been allocated to each antenna for RS may be also changed.

Figure 24:
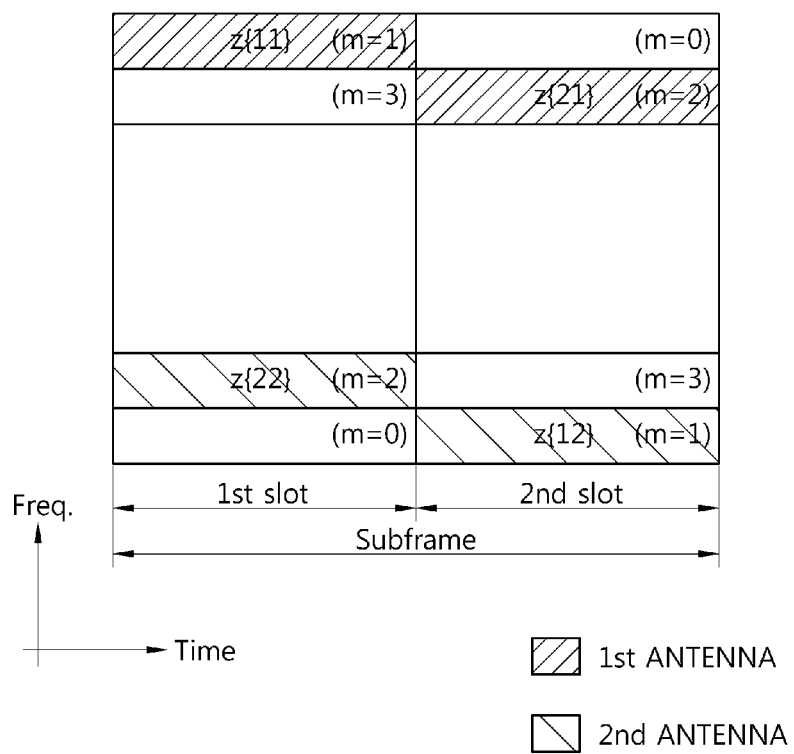
FIG. 24 shows another example of information transmission employing the PUCCH format 1/1a/1b.

FIG. 24 shows another example of information transmission employing the PUCCH format 1/1a/1b.

Referring to FIG. 24, z{11} is a first spread sequence transmitted through the first antenna, and z{22} is a second spread sequence transmitted through the second antenna. z{12} is a first spread sequence transmitted through the second antenna, and z{21} is a second spread sequence transmitted through the first antenna. During the first slot in a subframe, the first spread sequence is transmitted through the first antenna, and the second spread sequence is transmitted through the second antenna. In addition, during the second slot in the subframe, the first spread sequence is transmitted through the second antenna, and the second spread sequence is transmitted through the first antenna. Accordingly, during the second slot, the second information is transmitted based on the second resource index through the first antenna, and the first information is transmitted based on the first resource index through the second antenna. Here, the first interval is the first slot in the subframe, and the second interval is the second slot in the subframe.

Figure 25:
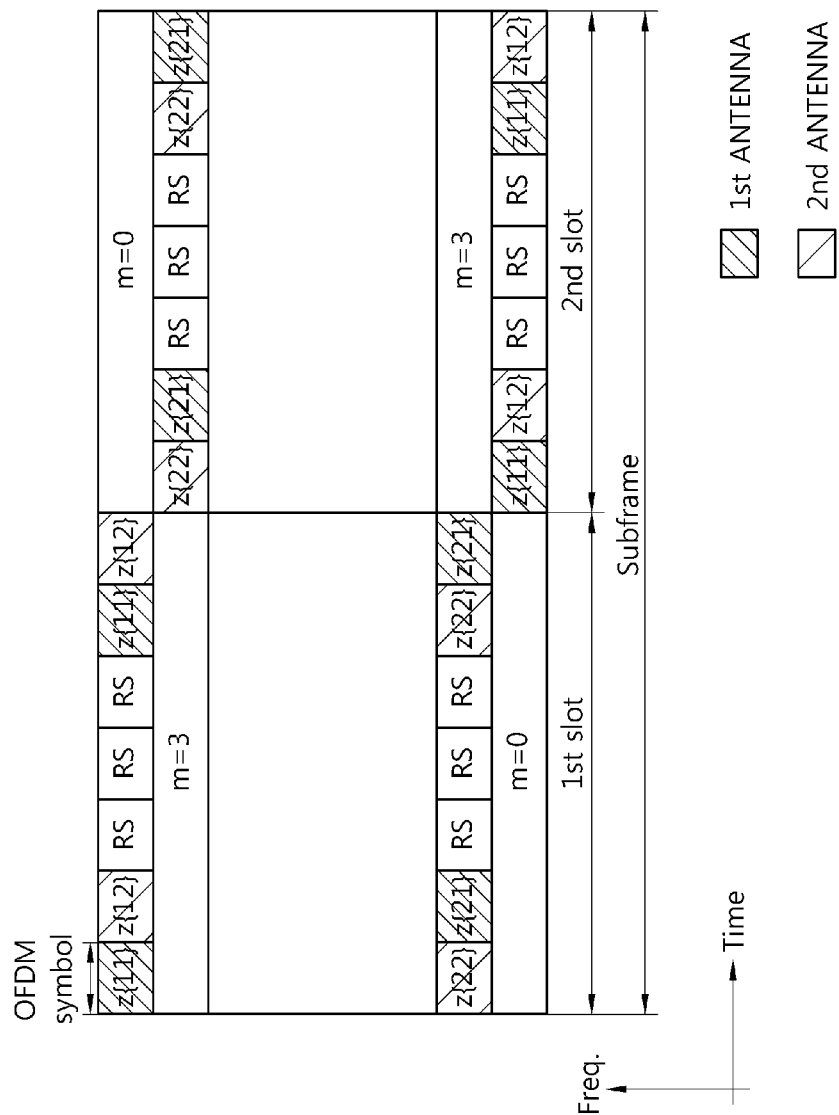
FIG. 25 shows still another example of information transmission employing the PUCCH format 1/1a/1b.

FIG. 25 shows still another example of information transmission employing the PUCCH format 1/1a/1b.

Referring to FIG. 25, the first and second intervals are OFDM symbols. In this case, a first OS index and a second OS index may be equally limited.

Second, an information transmission method employing the PUCCH format 2/2a/2b will now be described. A resource used for information transmission may be constituted as a combination of (1) a CS amount and (2) an RB. In this case, each resource index may indicate a CS index and an RB. In this case, a first resource index indicates a first CS index and a first RB, and a second resource index indicates a second CS index and a second RB.

The first information may be a first CQI with respect to a first downlink carrier, and the second information may be a second CQI with respect to a second downlink carrier. Otherwise, the first information may be a first CQI with respect to two codewords, and the second information may be a second CQI with respect to another two codewords. Each modulation symbol of the first and second information may be 10 modulation symbols obtained by performing QPSK modulation on 20-bit coded CQI bits. Otherwise, each modulation symbol of the first and second information may be 10×N modulation symbols obtained by performing QPSK modulation on 20×N-bit coded CQI bits. The first resource index and the second resource index may be indicated from the BS, respectively. Otherwise, the first resource index may be indicated from the BS, while the second resource index may be acquired by the UE from the first resource index.

Each information may be processed by using each resource index according to the PUCCH format 2/2a/2b. The UE may generate a first cyclically shifted sequence by cyclically shifting a base sequence by a first CS amount obtained from the first CS index, generate a first modulated sequence based on the first cyclically shifted sequence and the first modulation symbol with respect to the first information, and transmit the first modulated sequence through the first antenna after mapping the first spread sequence to the first RB. Also, the UE may generate a second cyclically shifted sequence by cyclically shifting the base sequence by a second CS amount obtained from the second CS index, generate a second modulated sequence based on the second cyclically shifted sequence and the second modulation symbol with respect to the second information, and transmit the second modulated sequence through the second antenna after mapping the second spread sequence to the second RB. In this case, the first modulated sequence and the second modulated sequence may be simultaneously transmitted.

Hereinafter, the (nr)th modulated sequence transmitted through the (nt)th transmission antenna will be represented as s{nr,nt}. The (nr)th modulated sequence is a sequence generated based on the (nr)th resource index and the (nr)th information. s{nr,nt} may be represented by the following equation.

MathFigure 9

$$s\{nr,nt\}(k,n+R_{nr})=d_{nr}(k)r(n,Ics^{nr}) \quad \text{[Math. 9]}$$

Here, k is a symbol index of OFDM symbols within the (nr)th RB indicated by the (nr)th resource index. Excluding an OFDM symbol in which the RS is carried, k may be 0, 1, . . . , 9. $R_{nr}$ is a frequency position offset of the (nr)th RB, and n is a subcarrier index within the (nr)th RB (n=0, 1, . . . , 11). $d_{nr}(k)$ is the (nr)th modulation symbol with respect to the (nr)th information, $Ics^{nr}$ is the (nr)th CS index, and $r(n,Ics^{nr})$ is the (nr)th cyclically shifted sequence.

FIG. 22 may be applied to an information transmission employing the PUCCH format 2/2a/2b. During the first slot of a subframe, the first modulated sequence is transmitted through the first antenna, and the second modulated sequence is transmitted through the second antenna. In addition, during the second slot of the subframe, the first modulated sequence is transmitted through the first antenna, and the second modulated sequence is transmitted through the second antenna. Also in case of the information transmission employing the PUCCH format 2/2a/2b, the slot level antenna changing as shown in FIG. 24 can be applied. In addition, also in the case of the information transmission employing the PUCCH format 2/2a/2b, the symbol level antenna changing can be applied.

Figure 26:
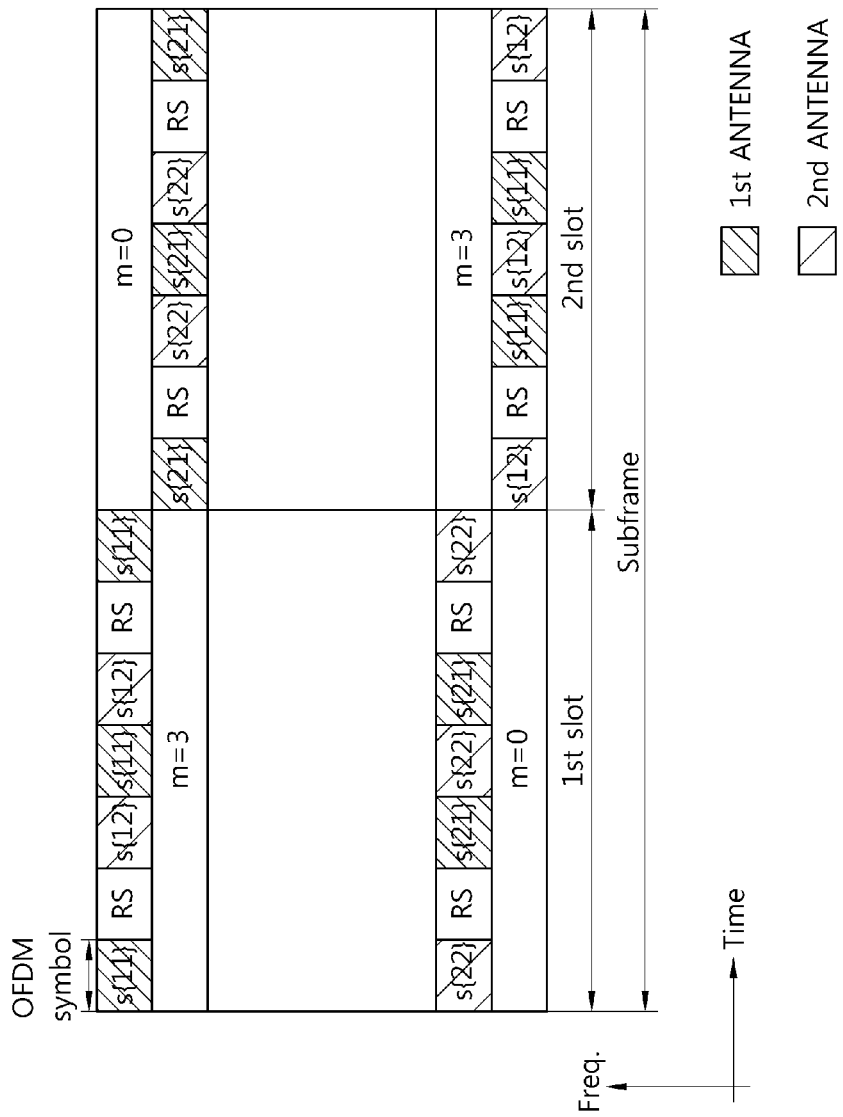
FIG. 26 shows an example of information transmission employing the PUCCH format 2/2a/2b.

FIG. 26 shows an example of information transmission employing the PUCCH format 2/2a/2b.

Referring to FIG. 26, s{11} is a first modulated sequence transmitted through the first antenna, and s{22} is a second modulated sequence transmitted through the second antenna. s{12} is a first modulated sequence transmitted through the second antenna, and s{21} is a second modulated sequence transmitted through the first antenna.

Figure 27:
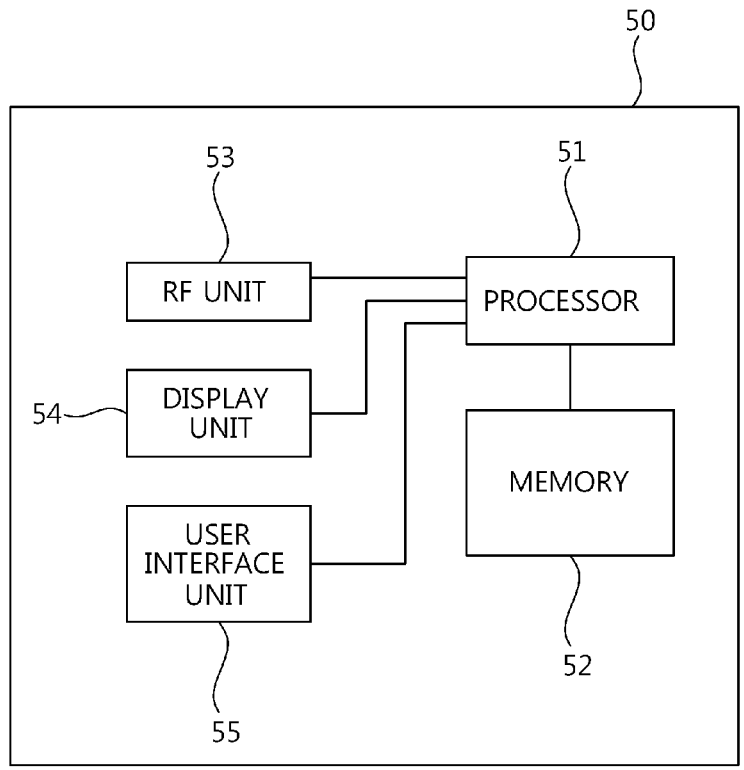
FIG. 27 is a block diagram of an apparatus for a wireless communication.

FIG. 27 is a block diagram of an apparatus for a wireless communication. An apparatus 50 for a wireless communication may be a part of an UE. The apparatus 50 includes a processor 51, a memory 52, an RF (radio frequency) unit 53, a display unit 54, and a user interface unit 55. The RF unit 53 is coupled with the processor 51, and configured to transmit and/or receive a radio signal. The memory 52 is coupled with the processor 51 and configured to store a driving system, applications and general files. The display unit 54 displays information on the UE and may use a well-known element such as liquid crystal display (LCD), organic light emitting diodes (OLED), etc. The user interface 55 may be implemented by a combination of user interfaces such as keypad, touch screen, etc. The processor 51 performs all the aforementioned operations including the operation of processing and transmitting information.

Figure 28:
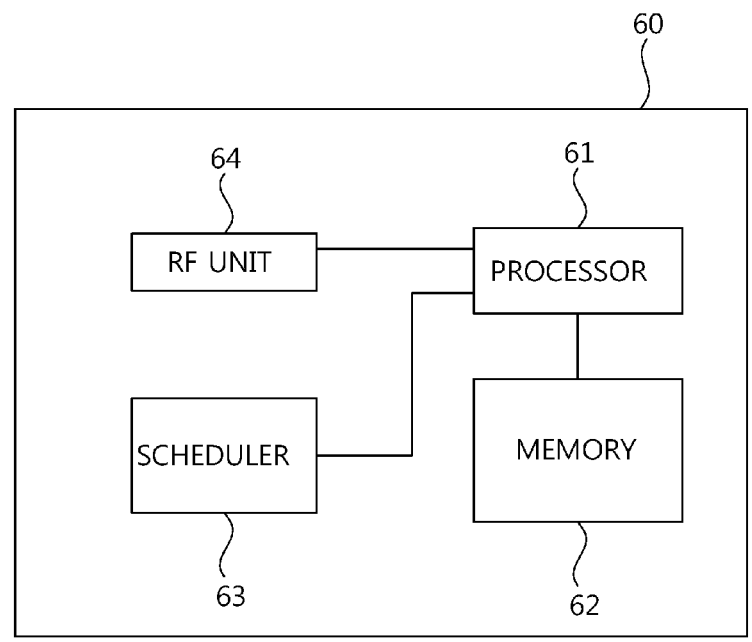
FIG. 28 is a block diagram of a BS.

FIG. 28 is a block diagram of a BS. A BS 60 includes a processor 61, a memory 62, a scheduler 63, and an RF unit 64. The RF unit 64 is coupled with the processor 61 and configured to transmit and/or receive a radio signal. The processor 61 can carry out all the above-described methods associated with transmitting information. The memory 62 is coupled with the processor 61 and configured to store information processed by the processor 61. The scheduler 63 is coupled with the processor 61 and can perform all the aforementioned methods associated with scheduling for transmission of information such as allocation of resource index.

In this manner, a method and an apparatus of effectively transmitting information are provided. The transmission diversity gain can be obtained, and orthogonality can be maintained between transmit antennas. In addition, additional information can be transmitted through a plurality of transmit antennas, and transmission rate may be increased. In addition, the backward compatibility with the 3GPP LTE can be satisfied. Thus, the reliability of radio communication can be enhanced, and the overall system performance can be improved.

Description so far has been mainly focused on the transmission of UL information, but the above-described content can be also applicable as it is to transmission of DL information. Also, the above-described content can be also applicable to transmission of general information such as transmission of data information as well as transmission of control information.

All functions described above may be performed by a processor such as a microprocessor, a controller, a microcontroller, and an application specific integrated circuit (ASIC) according to software or program code for performing the functions. The program code may be designed, developed, and implemented on the basis of the descriptions of the present invention, and this is well known to those skilled in the art.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

The invention claimed is:

1. A method of transmitting, by a user equipment (UE), information in a wireless communication system, wherein the wireless communication system is a multiple-input multiple-output (MIMO) system comprising a plurality of antennas, the method comprising:
    transmitting first information based on a first resource through a first antenna among the plurality of antennas during a first interval;
    transmitting second information based on a second resource through a second antenna among the plurality of antennas during the first interval;
    transmitting the second information based on the second resource through the first antenna during a second interval by an antenna swapping; and
    transmitting the first information based on the first resource through the second antenna during the second interval by the antenna swapping.

2. The method of claim 1, wherein the first resource and the second resource are different.

3. The method of claim 1, wherein each of the first information and the second information is information for a different component carrier.

4. The method of claim 1, wherein the first information corresponds to a first codeword generated by performing channel coding on a first information bit, and the second information corresponds to a second codeword generated by performing channel coding on a second information bit.

5. The method of claim 1, wherein the first information corresponds to some bits of a codeword generated by performing channel coding on a information bit, and the second information corresponds to the other remaining bits of the codeword.

6. The method of claim 1, wherein the first interval is a first slot in a subframe, and the second interval is a second slot in the subframe.

7. The method of claim 1, wherein each of the first interval and the second interval is an orthogonal frequency division multiplexing (OFDM) symbol.

8. The method of claim 1, wherein the first resource indicates a first cyclic shift (CS) index and a first resource block (RB), and the second resource indicates a second CS index and a second RB.

9. The method of claim 1, wherein the first resource indicates a first CS index, a first orthogonal sequence (OS) index, and a first RB, and the second resource indicates a second CS index, a second OS index, and a second RB.

10. The method of claim 9, wherein the first OS index and the second OS index are the same.

11. The method of claim 1, wherein the first information is first acknowledgement (ACK)/not-acknowledgement (NACK) information for first data transmitted through a first component carrier, and the second information is second ACK/NACK information for second data transmitted through a second component carrier.

12. A user equipment (UE) for a wireless communication, wherein the wireless communication system is a multiple-input multiple-output (MIMO) system comprising a plurality of antennas, the UE comprising:
- a radio frequency (RF) unit transmitting and/or receiving a radio signal; and
- a processor coupled with the RF unit and configured to;
- transmit first information based on a first resource through a first antenna among the plurality of antennas during a first interval;
- transmit second information based on a second resource through a second antenna among the plurality of antennas during the first interval;
- transmit the second information based on the second resource through the first antenna during a second interval by an antenna swapping; and
- transmit the first information based on the first resource through the second antenna during the second interval by the antenna swapping.

* * * * *